United States Patent
Deutsch et al.

(10) Patent No.: US 9,612,847 B2
(45) Date of Patent: Apr. 4, 2017

(54) DESTINATION LIST ASSOCIATED WITH AN APPLICATION LAUNCHER

(75) Inventors: Rebecca Deutsch, Seattle, WA (US); Benjamin Betz, Redmond, WA (US); Andrew Jennings, Seattle, WA (US); Stephan Hoefnagels, Seattle, WA (US); Patrice L. Miner, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 12/238,459

(22) Filed: Sep. 26, 2008

(65) Prior Publication Data

US 2009/0199122 A1     Aug. 6, 2009

Related U.S. Application Data

(63) Continuation-in-part of application No. 12/025,905, filed on Feb. 5, 2008, now abandoned.

(51) Int. Cl.
*G06F 3/048* (2013.01)
*G06F 9/44* (2006.01)

(52) U.S. Cl.
CPC .................. *G06F 9/4443* (2013.01)

(58) Field of Classification Search
CPC ............... G06F 9/445; G06F 9/54; G06F 8/60
USPC ................................................ 715/771, 811
See application file for complete search history.

(56) References Cited

U.S. PATENT DOCUMENTS

| | | | |
|---|---|---|---|
| 5,691,744 A | 11/1997 | Anstotz et al. | |
| 5,754,176 A * | 5/1998 | Crawford | ...................... 715/711 |
| 5,757,371 A | 5/1998 | Oran et al. | |
| 5,784,058 A | 7/1998 | LaStrange et al. | |
| 5,805,167 A * | 9/1998 | van Cruyningen | ........... 715/808 |
| 6,065,012 A * | 5/2000 | Balsara | .................... G06F 17/24 |
| 6,148,294 A * | 11/2000 | Beyda et al. | |
| 6,266,060 B1 | 7/2001 | Roth | |
| 6,271,844 B1 | 8/2001 | Selles | |
| 6,463,304 B2 | 10/2002 | Smethers | |
| 6,546,393 B1 | 4/2003 | Khan | |
| 6,557,028 B2 | 4/2003 | Cragun | |
| 6,563,514 B1 * | 5/2003 | Samar | .......................... 715/711 |
| 6,606,101 B1 * | 8/2003 | Malamud et al. | ............ 715/715 |
| 6,718,365 B1 | 4/2004 | Dutta | |
| 6,765,596 B2 | 7/2004 | Lection et al. | |

(Continued)

OTHER PUBLICATIONS

"Eric", 2005, 1 page. http://www.insimenator.net/archive/index.php/t-284.html.

(Continued)

*Primary Examiner* — Tadeese Hailu

(74) *Attorney, Agent, or Firm* — Jared S. Goff; Goff Patent Law PLLC

(57) ABSTRACT

A computer application launcher can be displayed. In response to receiving a first user input associated with the launcher while a computer application indicated by the launcher is not running, a destination list can be displayed. The destination list can include one or more destinations indicating one or more items that can be performed by a computer application. In response to a second user input associated with the destination list and indicating selection of a destination on the destination list, the application can be launched and instructed to perform an item indicated by the selected destination.

20 Claims, 11 Drawing Sheets

(56) References Cited

U.S. PATENT DOCUMENTS

| | | | |
|---|---|---|---|
| 6,823,344 B1* | 11/2004 | Isensee et al. | |
| 6,847,387 B2* | 1/2005 | Roth | 715/811 |
| 6,847,959 B1 | 1/2005 | Arrouye et al. | |
| 6,957,390 B2 | 10/2005 | Tamir et al. | |
| 6,957,396 B2 | 10/2005 | Iwamura | |
| 7,100,195 B1 | 8/2006 | Underwood | |
| 7,136,896 B1 | 11/2006 | Srinivas et al. | |
| 7,171,414 B1 | 1/2007 | Nazem et al. | |
| 7,203,909 B1 | 4/2007 | Horvitz et al. | |
| 7,225,407 B2 | 5/2007 | Sommerer et al. | |
| 7,237,240 B1* | 6/2007 | Chen et al. | 718/100 |
| 7,340,464 B2 | 3/2008 | Kelliher et al. | |
| 7,454,706 B1 | 11/2008 | Matthews et al. | |
| 7,480,863 B2* | 1/2009 | Branson et al. | 715/711 |
| 7,526,483 B2 | 4/2009 | Samji et al. | |
| 7,548,922 B2 | 6/2009 | Altaf et al. | |
| 7,689,647 B2 | 3/2010 | Joy et al. | |
| 7,730,134 B2 | 6/2010 | Blagsvedt et al. | |
| 7,814,089 B1 | 10/2010 | Skrenta et al. | |
| 8,046,694 B1 | 10/2011 | Lappas et al. | |
| 8,046,696 B2 | 10/2011 | Bales et al. | |
| 8,060,828 B2 | 11/2011 | Griffith et al. | |
| 8,156,448 B2 | 4/2012 | Niyogi et al. | |
| 8,271,486 B2 | 9/2012 | Caputo et al. | |
| 8,370,766 B2 | 2/2013 | Selig | |
| 8,402,375 B1 | 3/2013 | Skare et al. | |
| 2001/0020243 A1 | 9/2001 | Koppolu et al. | |
| 2002/0103789 A1 | 8/2002 | Turnbull et al. | |
| 2002/0149601 A1 | 10/2002 | Rajarajan et al. | |
| 2002/0191760 A1 | 12/2002 | Wattwood et al. | |
| 2002/0194194 A1 | 12/2002 | Fenton et al. | |
| 2003/0007012 A1 | 1/2003 | Bate | |
| 2003/0122874 A1 | 7/2003 | Dieberger et al. | |
| 2003/0156141 A1* | 8/2003 | Good et al. | 345/810 |
| 2003/0184583 A1 | 10/2003 | Lim | |
| 2004/0111499 A1 | 6/2004 | Dobrowski et al. | |
| 2004/0233235 A1 | 11/2004 | Rubin et al. | |
| 2004/0239637 A1 | 12/2004 | Williams et al. | |
| 2005/0010865 A1 | 1/2005 | Kuppusamy et al. | |
| 2005/0182798 A1* | 8/2005 | Todd et al. | 707/200 |
| 2005/0278655 A1 | 12/2005 | Sims et al. | |
| 2005/0289468 A1 | 12/2005 | Kahn et al. | |
| 2006/0101347 A1 | 5/2006 | Runov et al. | |
| 2006/0112181 A1 | 5/2006 | Affaki | |
| 2006/0123341 A1* | 6/2006 | Smirnov | 715/708 |
| 2006/0184890 A1 | 8/2006 | Altenhofen | |
| 2006/0218499 A1* | 9/2006 | Matthews | G06F 17/30616 715/765 |
| 2006/0218503 A1* | 9/2006 | Matthews | G06F 9/4443 715/779 |
| 2006/0242604 A1 | 10/2006 | Wong et al. | |
| 2006/0277492 A1* | 12/2006 | Matthews | G06F 9/4443 715/789 |
| 2007/0083829 A1* | 4/2007 | Lauridsen et al. | 715/847 |
| 2007/0100915 A1 | 5/2007 | Rose et al. | |
| 2007/0157113 A1* | 7/2007 | Bishop | H04L 67/36 715/786 |
| 2007/0157115 A1* | 7/2007 | Peters | 715/808 |
| 2007/0265930 A1 | 11/2007 | Mohr | |
| 2008/0120129 A1 | 5/2008 | Seubert et al. | |
| 2009/0006334 A1 | 1/2009 | MacLaurin et al. | |
| 2009/0055355 A1 | 2/2009 | Brunner et al. | |
| 2009/0199122 A1 | 8/2009 | Deutsch et al. | |
| 2009/0228804 A1 | 9/2009 | Kim et al. | |
| 2010/0138316 A1 | 6/2010 | Connors et al. | |
| 2011/0265027 A1 | 10/2011 | Lipstein et al. | |
| 2011/0276889 A1 | 11/2011 | Boshernitzan | |
| 2011/0276906 A1 | 11/2011 | Lipstein et al. | |
| 2011/0289157 A1 | 11/2011 | Pirnazar | |
| 2011/0307794 A1 | 12/2011 | Hilerio et al. | |
| 2011/0307810 A1 | 12/2011 | Hilerio et al. | |
| 2011/0307811 A1 | 12/2011 | Kim et al. | |
| 2011/0307883 A1 | 12/2011 | Hilerio et al. | |
| 2012/0166959 A1 | 6/2012 | Hilerio et al. | |
| 2012/0296959 A1 | 11/2012 | Momchilov et al. | |
| 2012/0297324 A1 | 11/2012 | Dollar et al. | |
| 2013/0097501 A1 | 4/2013 | Jiang | |

OTHER PUBLICATIONS

"Misc Destinations add {custom:contextname} or other direct jump to extensions_custom.conf contexts", (Retrieved on Aug. 22, 2008), 2 pages. http://www.freepbx.org/trac/ticket/1877.

Alan Cantor, "Radical Software Surgery: Case Studies in Advanced Customization", 2005 Conference Proceedings, 4 pages. http://www.csun.edu/cod/conf/2005/proceedings/2364.htm.

"The Two Inch View", (Retrieved on Aug. 22, 2008), Webpage Available at: http://reader.feedshow.com/show_items-feed=9513d5ca9b583f8e8e918ea313408809.

"RNS:: Hi-Launcher reviews by PalmGear customers", 2008, 7 pages. http://www.hilauncher.com/reviews_palmgear.php.

"8start Launcher 1.7", Retrieved at http://www.freeware-downloads.com/8start_launcher.htm, Date Released: Dec. 26, 2005, pp. 1-2.

"Quick Launch Bar and Start Menu Replacement", Retrieved at http://www.contextmagic.com/favorite-shortcuts/, Favorite Shortcuts v1.8.3 updated on Feb. 17, 2006, pp. 1-3.

Office Action, U.S. Appl. No. 12/025,905, filed Feb. 5, 2008, Office Action Mail Date: Jan. 18, 2011, Cover Page & pp. 1-16.

"8 Start Launcher," Retrieved at <<http://www.dirfile.com/8start_launcher.htm>>, Date released: Oct. 9, 2006, 3 pages.

"One-Click Access to Favorite Programs, Files and Folders," Retrieved at <<http://www.contextmagic.com/favorite-shortcuts/>>, Date Retrieved: Oct. 19, 2007, 3 pages.

Office Action, U.S. Appl. No. 12/025,905, filed Feb. 5, 2008, Office Action Notification Date: Jul. 22, 2011, 42 pages.

Office Action, U.S. Appl. No. 12/025,905, filed Feb. 5, 2008, Office Action Notification Date: Feb. 2, 2012, 27 pages.

Office Action, U.S. Appl. No. 12/025,905, filed Feb. 5, 2008, Office Action Notification Date: May 9, 2013, 24 pages.

"Windows 98 From Wikipedia, the free encyclopedia", Retrieved from <<http://en.wikipedia.org/wiki/Windows 98>>, Retrieved Date: Sep. 7, 2013, 11 Pages.

Office Action, U.S. Appl. No. 12/025,905, filed Feb. 5, 2008, Office Action Notification Date: Sep. 11, 2013, 27 pages.

Office Action, U.S. Appl. No. 12/025,905, filed Feb. 5, 2008, Office Action Notification Date: Mar. 21, 2014, 27 pages.

* cited by examiner

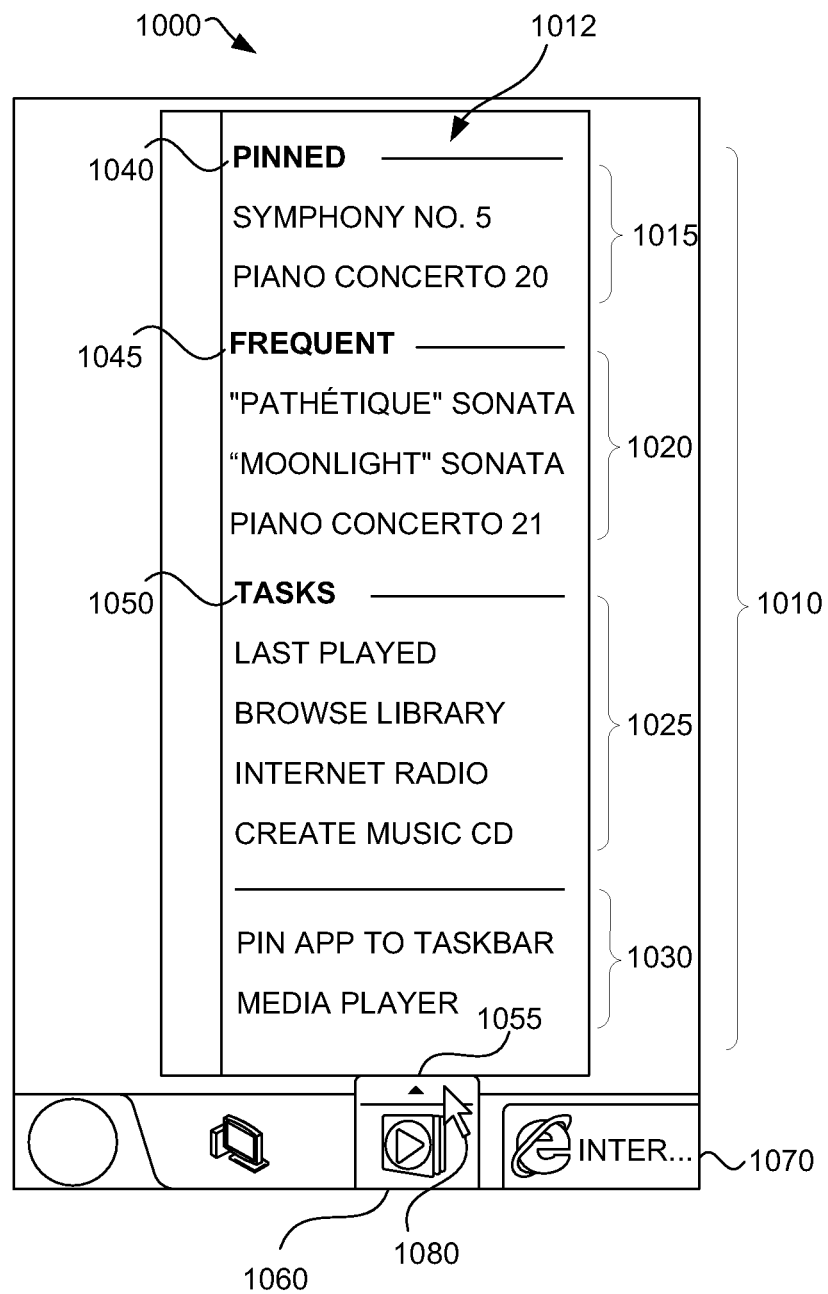

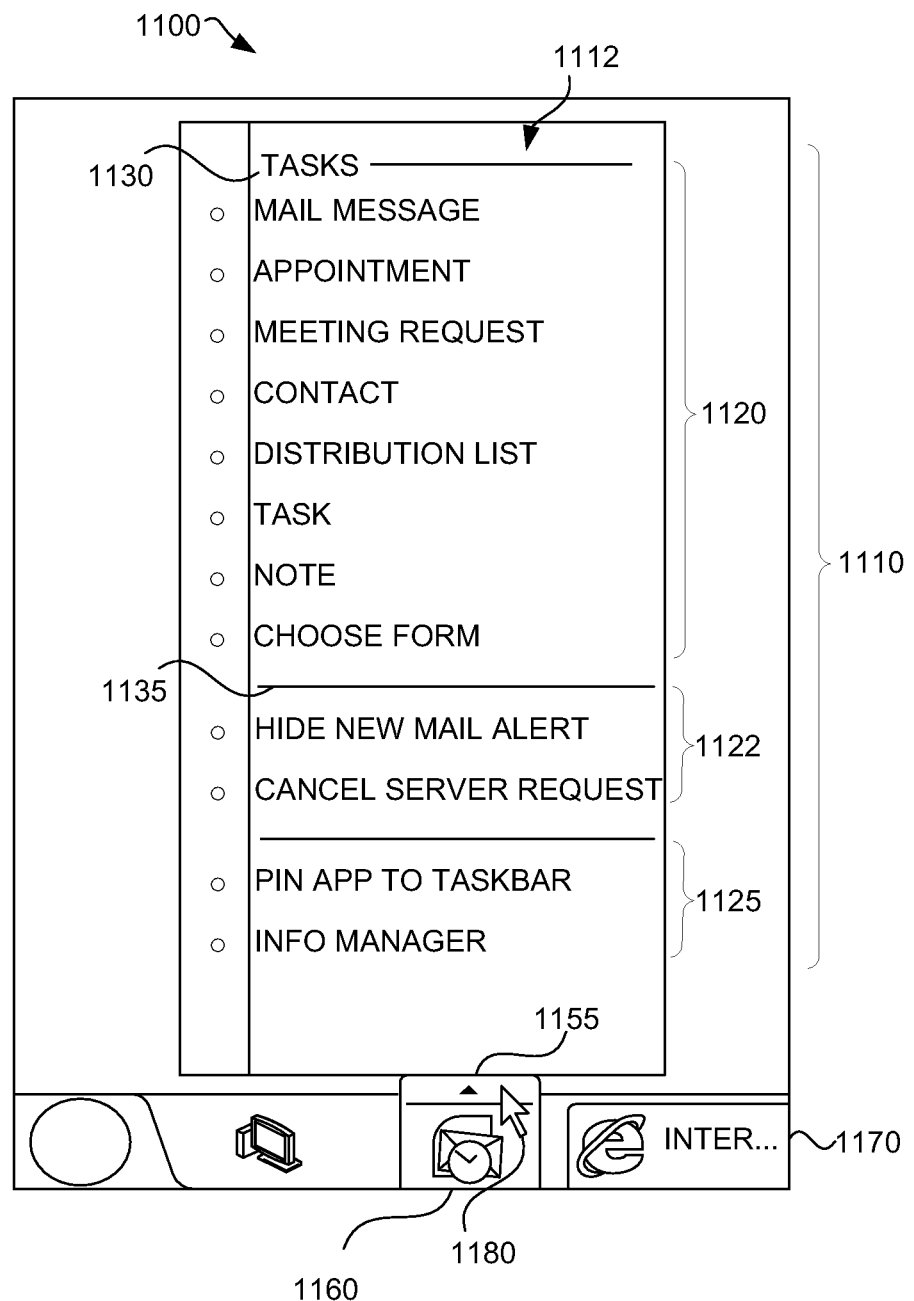

DESTINATION LIST ASSOCIATED WITH AN APPLICATION LAUNCHER

CROSS-REFERENCE TO RELATED APPLICATIONS

This application is a continuation in part of U.S. Ser. No. 12/025,905, filed on Feb. 5, 2008, entitled "Generating a Destination List Utilizing Usage Data", whose contents are expressly incorporated herein.

BACKGROUND

Existing computer applications are able to perform a variety of tasks that are useful and enjoyable for computer users. However, to perform a desired task, a user often must find the application the user wants to use, and launch the application. Then, the user must find the task or entry point for the action within the application. Then, the user must make one or more appropriate selections within the application (such as by depressing keyboard keys, giving voice commands, or making mouse clicks) before the application performs a desired task.

Presently, operating systems provide a variety of utilities that assist a user in conveniently launching applications and instructing applications to perform tasks. In some instances, operating systems have attempted to expedite launching applications by promoting frequently used applications to a list. This list of applications is typically viewable upon accessing a main application menu. However, this list often handles a small number of applications. In addition, those applications will only perform tasks after the user provides user input to launch the application and then provides additional input to the running application, such as entering a particular application environment or opening a file in the application.

Some operating systems have provided more convenient ways to perform tasks with applications that are currently running. For example, a list of commands may be provided when a user executes a mouse click while the cursor is within the running application window or within a button corresponding to the running application. As another example, notification icons are sometimes provided for applications that are running in the background, and a user can view a list of available tasks for such an application by executing a mouse click with the cursor hovering over the application's notification icon. However, often this still requires a user to select an application and launch it before such lists become available. An operating system can be configured to launch applications automatically when a user logs into the operating system, but this often takes up valuable system resources at times when the application is not being used.

As another example of operating systems attempting to make it more convenient to perform desired tasks, some operating systems allow the registration of general services. Once registered, the services can be selected by users to perform tasks on associated data. However, such lists of services are not conveniently associated with representations of applications that a user may want to launch to perform desired tasks.

SUMMARY

Whatever the advantages of previous computer system testing tools and techniques, they have neither recognized the item initiation tools and techniques described and claimed herein, nor the advantages produced by such tools and techniques.

In one embodiment, the tools and techniques can include receiving from a computer application a designation of one or more application-designated items that can be performed by the application. A computer application launcher for launching the computer application can be displayed and a user input associated with the launcher can be received. In response to the user input, an application-specific destination list for the computer application can be displayed while the computer application is not running. The destination list can include one or more destinations indicating the one or more application-designated items. In response to a user input selecting a destination on the destination list, the application can be launched and instructed to perform an item indicated by the selected destination.

In another embodiment of the tools and techniques, a computer application launcher can be displayed. In response to receiving a first user input associated with the launcher while a computer application indicated by the launcher is not running, a destination list can be displayed. The destination list can include one or more destinations indicating one or more items that can be performed by the computer application. In response to a second user input associated with the destination list and indicating selection of a destination on the destination list, the application can be launched and instructed to perform an item indicated by the selected destination.

In yet another embodiment of the tools and techniques, an application-specific destination list can be maintained. The destination list can include destinations indicating items that can be performed by a computer application, and a launcher that indicates the computer application can be displayed. In response to a user input associated with the launcher, the application-specific destination list can be displayed while the computer application is not running.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

BRIEF DESCRIPTION OF THE DRAWINGS

FIGS. 7-11 are screen displays of exemplary display areas that illustrate a submenu area populated with destinations, in accordance with described embodiments.

DETAILED DESCRIPTION

Figure 1:
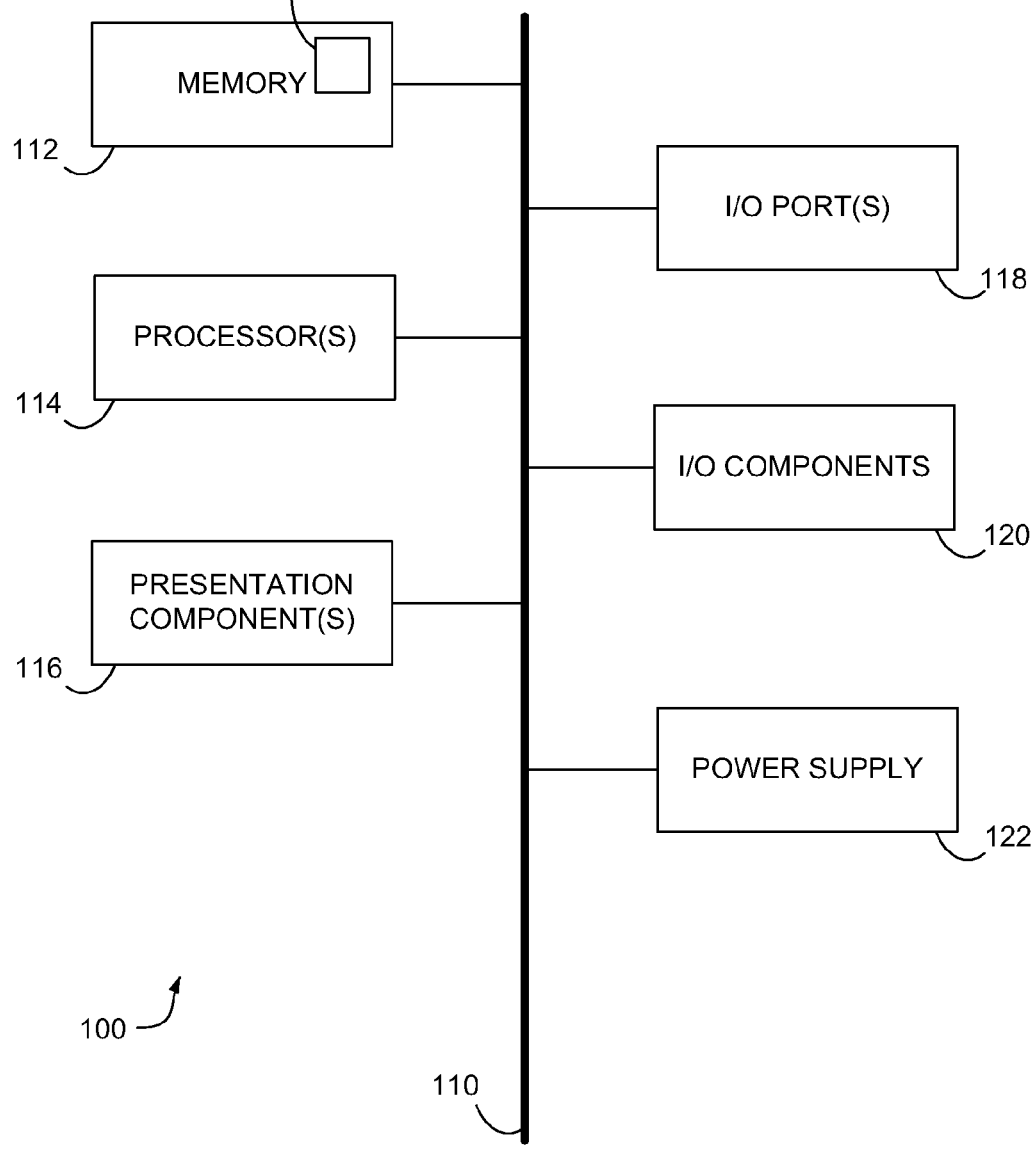
FIG. 1 is a block diagram of a suitable computing environment in which one or more of the described embodiments may be implemented.

Described embodiments are directed to techniques and tools for improved initiation of the performance of application-specific items in association with an application launcher. Such improvements may result from the use of various techniques and tools separately or in combination.

Such techniques and tools may include displaying an application-specific destination list in association with an application launcher, such as in response to user input associated with the application launcher (e.g., hovering a cursor over an area at or adjacent to the launcher or selecting a button associated with the launcher, such as a split button). The application-specific destination list can include a list of one or more destinations representing items that can be performed by an application when the application is running (e.g., performing a command or opening a file). However, the destination menu may be displayed whether or not the application is currently running. In response to a user selecting a destination on the destination list, the application can be launched and an item indicated by the destination can be performed by the application.

Thus, with a selection in an application-specific list associated with an application launcher, a user can initiate the execution or performance of a selected application-specific item, causing an inactive (i.e., not yet launched so that it is not currently running) application to launch and to perform a selected item. As used herein, an application-specific list is one that is customized for a particular computer application or set of related computer applications, as opposed to a standard list for all applications in an operating system or computing device. However, such a list can include some standard features, such as standard functionality for interacting with the list or standard destinations on the list. As used herein, reference to execution or performance of an application-specific item can refer to performance of various types of items by an associated application, such as, without limitation, executing a command in the application (e.g., sign in for an instant messaging client application, or backup now for a backup utility application); opening or executing a content item associated with the application (e.g., a file folder, word processing document, media file, email, calendar item, or web page); entering a particular mode or sub-experience in the application (e.g., entering an email inbox in an email application, or entering an Internet radio environment in a media application); and/or changing or setting a configuration or status of the application (e.g., launching a web browser with particular privacy and security settings). Accordingly, one or more substantial benefits can be realized from the tools and techniques described herein for performing application-specific items. For example, users can more quickly and easily invoke frequently used tasks or other items. As another example, available system resources may be freed because the application need not be running to enable a user to initiate the execution of application-specific items.

The subject matter defined in the appended claims is not necessarily limited to the benefits described herein. A particular implementation of the invention may provide all, some, or none of the benefits described herein. Additionally, although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. Moreover, for the sake of simplicity, flowcharts may not show the various ways in which particular techniques can be used in conjunction with other techniques.

As used herein, the phrase "destination list" is not meant to be limiting and may encompass any set, collection, manifest, catalogue, record, or index of destinations. Further, the phrase destination list may refer to an actual listing embedded in computer-readable media, or a representation of a destination list that may be presented at a user-interface display. In one instance, the destination list may be generated by the operating system (e.g., utilizing indications from an application of items to be indicated on the destination list and/or frequently or recently used items to be represented in the destination list). In another instance, the destination list can be generated at an application (e.g., providing destinations related to important items for many or all users of the application or items managed by the application that have been accessed by a user). In yet another instance, a user is able to influence contents of the destination list (e.g., pinning a destination to the destination list). As such, it should be understood and appreciated that the destination list can take on many forms and can be created or modified by one or more entities using various editing techniques. Upon generation, the destination list can be stored in one or more locations, such as on a local disk drive, within a database, or at a remote website.

In an exemplary embodiment, the destination list includes one or more destinations. The term "destinations" is used broadly herein and refers to locations of items that are identified by a target application. The locations of items may take the form of an address to a file, a universal naming convention (UNC) path to a folder or working directory, a uniform resource locator (URL) of a website, a command line, identifier structures in binary format, or any other string of characters or other data that signifies a particular item. In embodiments, the item can include, but is not limited to, a file (e.g., document, media, content), a task (e.g., user-initiated action, command that is executable by a computing device), a folder, a directory, a website, an applet, or a device.

Having briefly described an overview of embodiments and some of the features therein, an exemplary operating environment suitable for implementing described embodiments is described below.

Exemplary Computing Device

Referring to the drawings in general, and initially to FIG. 1 in particular, an exemplary operating environment for implementing described embodiments is shown and designated generally as computing device (100). Computing device (100) is but one example of a suitable computing environment and is not intended to suggest any limitation as to the scope of use or functionality of the invention. Neither should the computing device (100) be interpreted as having any dependency or requirement relating to any one or combination of components illustrated.

Embodiments may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks or implements particular abstract data types. Embodiments may be practiced in a variety of system configurations, including handheld devices, consumer electronics, general-purpose computers, specialty computing devices, etc. Embodiments may also be practiced in distributed computing environments where tasks are performed by remote-processing devices that are linked through a communications network.

With continued reference to FIG. 1, the computing device (100) can include a bus (110) that directly or indirectly couples the following devices: memory (112), one or more processors (114), one or more presentation components (116), input/output (I/O) ports (118), I/O components (120), and an illustrative power supply (122). The bus (110) represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component such as a display device to be an I/O component. In addition, processors have memory. The inventors hereof recognize that such is the nature of the art and reiterate that the diagram of FIG. 1 is merely illustrative of an exemplary computing device that can be used in connection with one or more embodiments. Distinction is not made between such categories as "workstation," "server," "laptop," "handheld device," etc., as all are contemplated within the scope of FIG. 1 and references to "computer" or "computing device."

The computing device (100) typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM; digital versatile disks (DVD) or other optical or holographic media; magnetic cassettes; magnetic tape; magnetic disk storage or other magnetic storage devices or any other medium that can be used to encode desired information and be accessed by the computing device (100).

The memory (112) includes computer-storage media in the form of volatile and/or nonvolatile memory. The memory may be removable, non-removable, or a combination thereof. Exemplary hardware devices include solid-state memory, hard drives, optical-disc drives, etc. The computing device (100) can include one or more processors that read data from various entities such as the memory (112) or the I/O components (120). The presentation component(s) (116) can present data indications to a user or other device. Exemplary presentation components include a display device, speaker, printing component, vibrating component, etc. The I/O ports (118) allow the computing device (100) to be logically coupled to other devices including the I/O components (120), some of which may be built in. Illustrative components include a microphone, joystick, game pad, satellite dish, scanner, printer, wireless device, etc. The memory (110) can include software stored thereon, such as software (180) implementing a destination list associated with an application launcher.

Exemplary System and Environment

Figure 2:
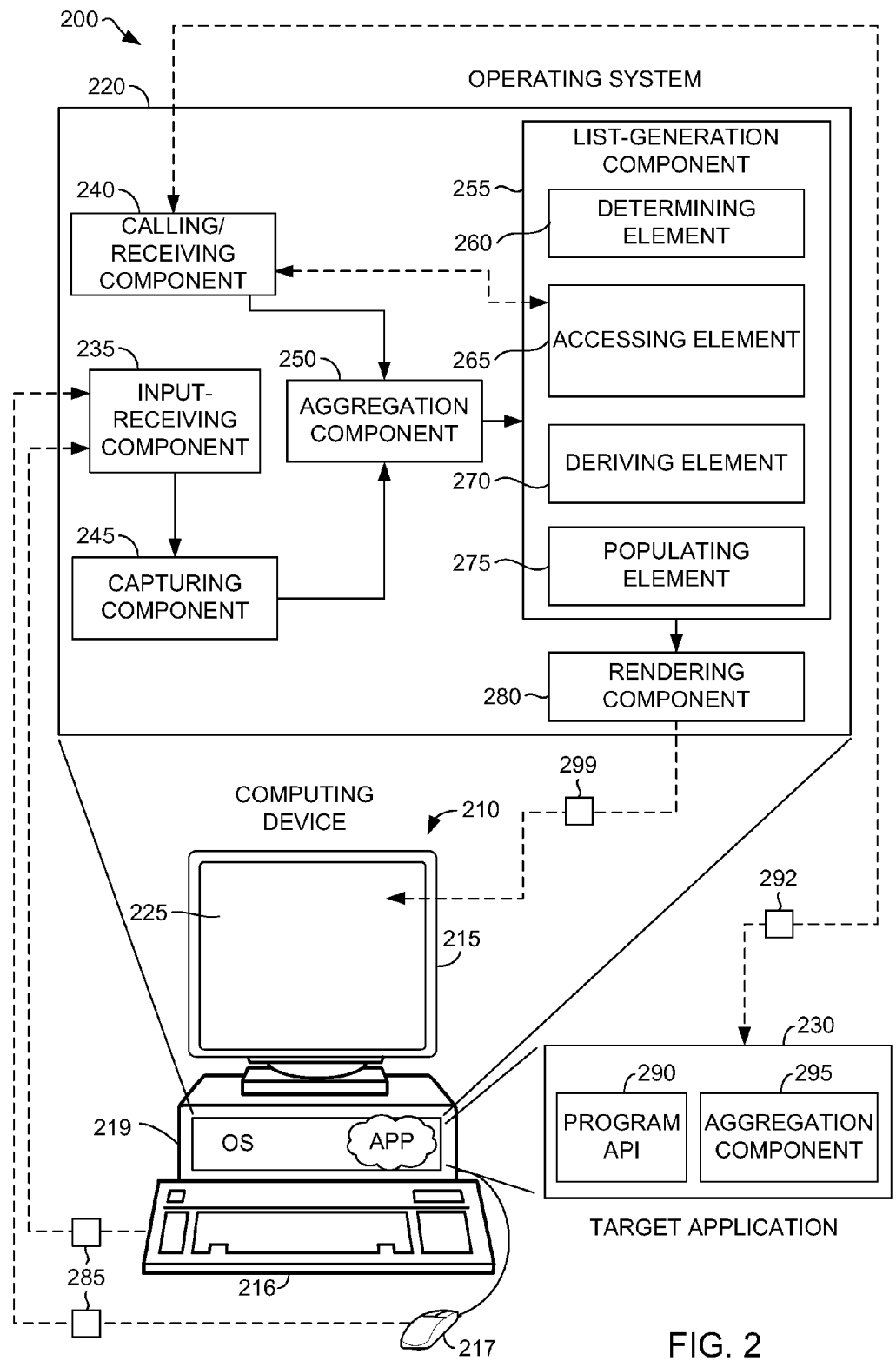
FIG. 2 is a schematic diagram of an exemplary system architecture suitable for use in implementing described embodiments, in accordance with a described embodiment.

Turning now to FIG. 2, a schematic diagram of an exemplary system architecture (200) suitable for use in implementing described embodiments is shown, in accordance with a described embodiment. It will be understood and appreciated by those of ordinary skill in the art that the exemplary system architecture (200) shown in FIG. 2 is merely an example of one suitable computing environment and is not intended to suggest any limitation as to the scope of use or functionality of the present invention. Neither should the exemplary system architecture (200) be interpreted as having any dependency or requirement related to any single component or combination of components illustrated therein.

The exemplary system architecture (200) can include a computing device (210) for generating an application-specific list of destinations, which represent and indicate application-specific items (e.g., commands that can be executed or content items that can be opened by the application), and for rendering the destinations within a submenu area associated with an application launcher upon detecting a request from a user. The list of destinations may be generated from data, such as data at a data store (e.g., registry or any other information-storage location internal or external to the operating system (220)). The computing device (210) may take the form of various types of computing devices. By way of example only, the computing device (210) may be a personal computing device (e.g., the computing device (100) of FIG. 1), handheld device (e.g., personal digital assistant), consumer electronic device, various servers, and the like. Additionally, the computing device may comprise two or more electronic devices configured to share information therebetween.

In embodiments, the computing device (210) includes a display device (215), input devices (216 and 217), and hardware (219) with an operating system (220) installed thereon. The computing device (210) is configured to present a UI display (225) on the display device (215). The display device (215), which is operably coupled to the computing device (210), may be configured as any presentation component that is capable of presenting information to a user, such as a monitor, electronic display panel, touch-screen, and the like. In one exemplary embodiment, the UI display (225) is configured to present a submenu area (not shown) initiated by the operating system (220), where the submenu area includes the destination list to a user. In another exemplary embodiment, the UI display (225) is capable of rendering a trigger area proximate to an application launcher icon that, when actuated, invokes the submenu area.

The input devices (216 and 217) are provided to provide input(s) affecting, among other things, a presentation of the destination list within the submenu area on the UI display (225). Illustrative devices include a key pad (216), a mouse (217), a joystick (not shown), a microphone (not shown), the I/O components (120) of FIG. 1, or any other component capable of receiving a user input and communicating an indication of that input to the computing device (210). By way of example only, the input devices (216 and 217) control the location where a cursor tool is positioned (i.e., hovers) on the UI display (225) and/or the selection of buttons appearing on the UI display (225).

The operating system (OS) (220) refers generally to the software that manages the sharing of the resources of the computing device (210) and provides programmers with an interface used to access those resources. In operation, the operating system (220) interprets system data and detects user inputs (e.g., via the input devices (216 and 217)), and responds by executing such processes as the following: prioritizing system requests (e.g., a user-initiated request to view a destination list); allocating internal system resources; facilitating networking between the resources and/or devices; managing tasks (e.g., generating a destination list) and file systems; controlling output devices (e.g., rendering a destination list at the display device (215)); and operating as a platform for programs residing thereon, such as a target application (230).

In an exemplary embodiment, the operating system (220) includes an input-receiving component (235), a calling/receiving component (240), a capturing component (245), an aggregation component (250), a list-generation component (255), and a rendering component (280). In addition, the list-generation component (255) may include a determining element (260), an accessing element (265), a deriving element (270), and a populating element (275). This operating-system structure of the operating-system (220) is but one example of a suitable structure that may be run on the computing device (210), and is not intended to suggest any limitation as to the scope of use or functionality of the invention. Neither should the illustrated operating system (220) be interpreted as having any dependency or requirement relating to any one or combination of the components/elements (235, 240, 245, 250, 255, 260, 265, 270, 275, or 280) as illustrated. In some embodiments, one or more of the components/elements (235, 240, 245, 250, 255, 260, 265, 270, 275, or 280) may be implemented as stand-alone applications. In other embodiments, one or more of the components/elements (235, 240, 245, 250, 255, 260, 265, 270, 275, or 280) may be integrated directly into the display device (215) of the computing device (210), the target application (230), or a combination thereof. By way of example only, the rendering component (280) may be housed in association with the display device (215), while the capturing component (245) may reside in the target application (230), thereby monitoring activities related to items managed by the target application (230). It will be understood by those of ordinary skill in the art that the components/elements (235, 240, 245, 250, 255, 260, 265, 270, 275, and 280) illustrated in FIG. 2 are exemplary in nature and in number and should not be construed as limiting.

Any number of components/elements may be employed to achieve the desired functionality. Although the various components/elements of FIG. 2 are shown with lines for the sake of clarity, in reality, delineating various components/elements is not so clear, and metaphorically, the lines would more accurately be grey or fuzzy. Further, although some components/elements of FIG. 2 are depicted as single blocks, the depictions are exemplary in nature and in number and are not to be construed as limiting (e.g., although only one display device (215) is shown, many more may be operably coupled to the computing device (210), thereby functioning in conjunction to present the UI display (225)).

In embodiments, the input-receiving component (235) is configured to receive and process indications of commands (285) from the input devices (216 and 217). These indications of commands (285) may include any outputs within a scope of outputs produced by the input devices (216 and 217). In one embodiment, the outputs include indications of user-initiated activities associated with items managed by the target application (230). In another embodiment, the outputs include a user-initiated indication to view a destination list. In one instance, as discussed more fully below, the user-initiated indication or user input selection to view a destination list is an indication to move a cursor tool into a trigger area rendered on the UI display (215). In another instance, the user-initiated indication or user input selection to view the destination list is a selection of a button (e.g., a split button) presented on the UI display (225).

The capturing component (245) may be configured as an underlying program that continuously monitors usage data that corresponds with particular applications. In an exemplary embodiment, the usage data is information related to user-initiated activities associated with the items managed by the target application (230). For instance, the usage data can include an indication that a user has opened a document managed by document-editing software (i.e., the target application (230)). In another instance, the usage data includes an indication that the target application (230) has been active for over a prescribed amount of time, typically reported from a timer object (not shown). Although two different instances of the usage data have been described, it should be understood and appreciated that other usage data could be monitored and stored by the capturing component (245), and that the scope of functionality of the capturing component (245) is not limited to capturing the usage data shown and described. In addition, in some embodiments, no usage data is monitored.

In embodiments, the aggregation component (250) generates application-specific records, such as from usage data and/or from designations from the target application (230). Generally, the records can include information associated with a particular item, such as a content item that can be managed by the target application (230) or a command that can be executed by the target application (230). For instance, some usage-based records can include a score indicating the frequency with which an item is invoked and a timestamp indicating when the item was last invoked. Records may also include a content item shell or a command item shell. A content item shell can include, among other things, an item identifier or display name (e.g., a common namespace) and a location of the content item, such as an address within the operating system (220), a pathway to a remote host, and the like. A command item shell can include an item identifier or display name and a location of the item, which can be a corresponding command line. An item shell may also include other information, such as a location of a corresponding icon to be displayed in a corresponding destination in a destination list and a corresponding tooltip to be displayed when a cursor hovers over a corresponding destination in a destination list. In an exemplary embodiment, records are indexed according to applications, such that records relating to an item are associated with the application that manages the item. In one instance, indexing includes storing the records in a table format at a data store. The table format lists records stored in a manifest underneath a heading depicting the application to which the records correspond; that is, the table format is generally data of a set of items, such as a usage-based set of items and/or an application-designated set of items, collected together and sorted based on which application is used to perform the corresponding set of items.

In embodiments, a timestamp, a score, and an item shell may comprise elements of a usage-based destination item record that is listed as an entry within the table format. By way of example only, the record may describe a content item as a media file, such as a digital recording, and the associated record may include the following elements: a timestamp indicating the media file was opened at 12:31 PM, a score indicating that the media file is opened very frequently, an item identifier of "Hey Jude," and a location of the media file on a C-drive in a "Beatles" folder. The record may also include an indication of whether the item has been designated by the corresponding application to be included in an application-designated listing in a destination list.

As discussed above, the score is an indication of the frequency with which an item is invoked. In one instance, the score is calculated by incrementally increasing a running account each time the item is accessed. In addition, the running account may be incremented if a timer object reports that the time has been active for more than a prescribed amount of time. For instance, if the prescribed amount of time is four hours and a file has been open for five hours, the score for the file is incremented twice, once for initially opening the file and again for meeting the prescribed time criteria. Incrementing a score because an item is active for a period of time is based on the assumption that a user is more apt to access this item again if it is opened for a long time, as opposed to an item that is opened for a brief duration of time.

In a more sophisticated embodiment, a decay algorithm can be applied to the scores of each item. Generally, the decay algorithm reduces a score for an item that has not been used recently. In operation, the decay algorithm allows scores of individual items to increment until a combined-score limit has been reached. At this point, the score associated with the item that is being accessed is incremented, as before in the degraded model above, but the scores of each of the other items in the set of items managed by an application are decreased by a fractional point. In other words, points are given to items until a maximum point total for a set of items has been reached. At that point, when a point is given to an item, a fractional point is taken away from the other items in the set of items, where the sum of the fractional points equals a single point. By way of example only, a send-email task (i.e., the item) is one of twenty tasks (i.e., the set of items) associated with an email application. If a user initiates the send-email task, by way of the indication of a command (285), the score associated with the email task is increased by a point, while the scores of the other tasks are reduced by $1/19$th of a point. This practice of reducing the scores associated with the items in the set of items is based on the assumption that a user is more likely to access a recently activated item than one accessed in the past. It should be understood and appreciated that the scope of the present invention is not limited to the methods for calculating a score and decaying the score described above. Embodiments could use other models for calculating a score, and other decay algorithms for accurately reflecting a user's current preference of which items the user desires to view in a destination list. Indeed, in some embodiments no usage-based calculations are made. For example, all the items could be designated by the corresponding application without making usage-based calculations.

As discussed above, the records of items can be listed as entries in a manifest associated with an application that manages those items. The manifest may include listings of items, wherein each listing is an aggregation of items according to a logical scheme. One embodiment of a usage-based listing is a listing of recently used items. The listing of recently used items can be built according to the timestamp associated with each item in the set of items. In one instance, the list is built by ranking the items from the item with a most recent timestamp to the item with an earlier timestamp. Another embodiment of a usage-based listing is a listing of frequently used items. The listing of frequently used items is built according to the score associated with each item in the set of items. In one instance, the list is built by comparing each score of an item against a predefined threshold score and populating the listing of frequently used items with those items with a score that overcomes the threshold. In this way, only those items that are frequently accessed by a user, as indicated in the usage data, are incorporated in the listing of frequently used items. In some implementations, the listing is populated with those items with the highest scores, but no threshold is used.

Another embodiment of an application-designated listing is a listing of application-designated items that are indicated by a corresponding application in a particular circumstance, regardless of usage by a particular user. Alternatively, an application-designated listing could be a listing of items based on some combination of usage and designation by an associated application. As used herein, application-designated items represent items that are designated by the corresponding application, such as the target application (230), to be indicated by destinations in a destination list. For example, the target application (230) can designate application-specific items that are commonly used by many or all users of the target application (230). In addition to initially designating a set of application-designated items, the target application (230) may also send list update information to update the list information in the manifest for application-designated items. This list update information could include list information such as updated item shells corresponding to application-designated items to be indicated by updated destinations in an updated destination list and/or updated list configuration settings. As an example, such updated information could be sent by the target application (230) when the application changes state.

As an example of application-designated items, if the target application (230) is a media application, the application-designated items could be indicated by the labels Play All Shuffled, Last Played, Browse Library, Create Music CD, Internet Radio, and Sync to Device, among others. As another example, if the target application is a personal information management program, the application-designated items could be indicated by the labels E-mail Inbox View, Calendar View, Tasks View, Contacts View, New Email, and New Calendar Item, among others. As another example, if the target application is an instant messaging application, indicated items could be indicated by the labels Sign In or Sign Out (depending on whether a user is currently signed in), Change States, and New Conversation, among others. A destination list may include sub-lists. For example, the Change States entry might have a sub-menu that appears with a sub-destination list of states to select between, such as "Available," "Offline," "At Lunch," "Do Not Disturb," etc. As yet another example, for an application for educating users about features of a computing system (such as a "Welcome Center," "Getting Started," or similar application), application-designated items could be indicated by the labels Connecting to a Network, Personalizing the Desktop, and Setting up Backup, among others.

An application can indicate the application-designated items in many ways. For example, the target application (230) can communicate application-designated item shells (292) to the calling/receiving component (240) of the operating system (220). While such communications could be initiated by the calling/receiving component (240), in some embodiments, the communications to send item shells (292)

are primarily initiated by applications, such as the target application (230). In addition to the application-designated item shells (292), the program API can also send other list information such as configuration settings (e.g., an ordering or priority for listing the destinations corresponding to the application-designated items).

As an example, for each application-designated item, the application-designated item shell (292) can include a location such as a link, path and filename, or command line to launch the application with a desired experience. The application-designated item shell (292) may also include some or all of the following display information for each item: a designation of an icon corresponding to the item (e.g., a location of a single file, such as a .ico file, containing the icon, or a location of the icon in a larger file, such as a location in a .dll file); a display name corresponding to the item; and a tooltip corresponding to the item. Thus, as an example, an application-designated item shell (292) could include the following commands (which are pseudo-commands here) for an item: Set Command Outlook.exe\composenewmail; Set Icon OutlookCompose-NewMail.ico; Set Display Name "New Mail"; and Set Tooltip "New Mail Message". As just one example, the existing IShellLink API could be used for communicating the information for an application-designated item shell (292). Alternatively, the application-designated item shell (292) could be an object that implements the existing IShellItem interface, other existing or new API's could be used, or application-designated item shells (292) could be communicated to the operating system (220) in some other manner. Thus, the list-generation process can be extensible to retrieve application-designated item shells from a variety of applications, including applications that are developed after installing the operating system (220) on the computing device (210). In addition, all application-designated information for an entire list could be sent at one time, or individual parts of the information could be sent individually and/or updated individually.

The application-designated item shells (292) can be initially communicated to the operating system (220) when the target application (230) is installed or linked with the operating system (220), or at some other time. For example, the operating system (220) could query the target application (230) when the associated launcher is displayed or when a user requests the display of the sub-menu including a destination list corresponding to the target application (230). Moreover, the target application (230) can update the information. For example, the target application (230) may update the information when the application changes state. For example, an instant messaging client application may update a "Sign In" application-designated item to a "Sign Out" application-designated item when a user signs in. As another example, the target application (230) may update information depending on whether the target application (230) is running or inactive.

The operating system (220) may include the application-designated item shells (292) in a manifest with other item shells, such as usage-based item shells. Alternatively, application-designated item shells could be stored in separate manifests, stored by separate programs, or stored in some other manner. For example, usage-based items and application-designated items could both be managed by the target application (230) and aggregated together by an aggregation component (295) in the target application (230), as discussed below.

Although several different listings of application-specific items that may be included in the manifest have been discussed, it should be understood and appreciated that other usage-based listings of items (based on the timestamp, the score, other criteria, or any combination thereof), other application-designated listings of items, other user-indicated listings of items, or other types of listings could be built, and that embodiments are not limited to those listings described herein. Moreover, the manifest may include other items, such operating system items (i.e., items that can be performed by the operating system without launching the application), such as pinning the program to a launcher or launching an application in a standard manner without instructing the application to perform a specified application-specific item. In addition, the listings can be built dynamically. That is, the listings can be continuously or periodically updated in an automated fashion by the aggregation component (250) (e.g., utilizing a recent-items application programming interface). In one instance, updating is triggered by changes to the usage data collected by the capturing component (245), or by update information received from the target application (230), such as when the target application (230) changes state.

In an exemplary embodiment, the aggregation component (250) utilizes configuration parameters to build the listings. Accordingly, the configuration parameters can comprise rules that dictate how many, and which, items are to be indexed in a particular listing. The configuration parameters may encompass a wide scope of criteria or properties provided by any source. In one instance, the configuration parameters may be provided by the operating system (220) (e.g., the predefined usage threshold). In another instance, the configuration parameters are provided by a user (e.g., preferred websites that comprise a favorites listing). In yet another embodiment, the configuration parameters are provided by the target application (230) (e.g., which recently-visited websites are included in a listing). Alternatively, the configuration parameters could be some combination of these, or they could come from some other source, such as another program.

In embodiments, manifests of items may also be collected and edited by the target application (230). Generally, the target application (230) is any program that may be launched and manipulated by the operating system (220). These manifests may include listings of items (e.g., tasks or content items) managed by the target application (230) that are built according to the configuration parameters provided by the target application. Initially, building may include capturing usage data by a program API (290) or some other API that is controlled by the target application (230). In one instance, the program API (290) operates substantially similar to the capturing component (245). That is, the program API (290) monitors user activities and stores usage data as records in a listing. The aggregation component (295) dynamically builds listings by arranging items in the set of items according to configuration settings. The configuration settings may indicate which listings are used to generate a destination list and which items are utilized when building a particular listing. The configuration settings may also indicate particular application-designated item shells (292) for a particular state of the application. In embodiments, the configuration settings direct the aggregation component (295) to generate a destination list with one, two, or several separate listings. In addition, the types of listings selected for the destination list may be indicated by the configuration settings. For instance, the configuration settings may indicate that the destination list should be built from a listing of important application-designated task items, as predefined by the target application (230), a listing of preferred command items, as provided by a user, and a listing of recently/frequently opened content items (e.g., files), as determined from user activity monitored by the program API (290). Although a particular embodiment of building a destination list using exemplary configuration settings is described above, it should be understood and appreciated that the configuration settings may guide the aggregation component (295) to build a destination list utilizing any number and type of listings. Further, this completed destination list may be provided to the operating system (220) regularly, upon a change of state of the target application (230), upon a detecting an indication to surface the destination list, or upon the occurrence of some other event.

In some embodiments, the configuration settings indicate which items are incorporated into a particular listing. Accordingly, the configuration settings may comprise information related to which application-designated items are predefined as being in a listing (e.g., top-five most important tasks), which items are selected by a user (e.g., preferred items) for incorporation into a listing, and which items to add to a listing with reference to usage data gathered by the program API (290). By way of example only, a calendar application (i.e., the target application (230)) builds a listing of upcoming appointments from saved appointments (i.e., the set of items) that is limited to the ten most recent appointments beyond the present time (i.e., utilizing configuration parameters provided by the target application (230)). In another example, a web-browser application (i.e., target application (230)) builds a listing of favorite websites that is limited to the user-preferred websites (i.e., utilizing configuration parameters provided by the user). Item shells (292) describing items indexed by listings built by the target application (230) may be provided to the calling component (240) on the operating system (220), as more fully discussed below.

As discussed above, the listings that comprise the manifests can be dynamically built by the operating system (220) and/or the target application (230). The process of building may be executed in series, in parallel, or asynchronously with executing a list-generation procedure, as more fully discussed below with reference to the list-generation component (255). As such, it should be understood and appreciated that building a listing within a manifest and constructing a destination list may not be interdependent upon each other.

Returning to an exemplary structure of the operating system (220) of FIG. 2, the list-generation component (255) will now be described. Generally, the list-generation component (255) is configured to construct a destination list utilizing a list-generation procedure. Typically, the destination list is generated incident to receiving one or more user-initiated indications to view the destination list as provided via the indication of a user input command (285) from the display devices (216 and 217). However, the list-generation procedure may be executed independent of a request, such as at regular intervals or in response to a prompt internal to the operating system (220). Because the contents of the destination list are updated automatically, the destination list can reflect items that are relevant to a user's current task.

In embodiments, the list-generation component (255) may include the determining element (260), the accessing element (265), the deriving element (270), and the populating element (275). The determining element (260) is generally configured to determine the appropriate data stores from which to select item shells (e.g., item shell (292)) and to determine properties of a submenu area allocated for displaying the destination list. In an exemplary embodiment, configuration settings are utilized to determine the appropriate data stores, and listings within the data stores, to access. Generally, the configuration settings comprise rules that guide the accessing element (265) to retrieve the proper item shells from a proper listing within a data store. The configuration settings may encompass a wide scope of criteria or properties provided by any source. In one instance, the configuration settings may be provided by the operating system (220). By way of example only, the configuration settings provided by the operating system (220) may direct the accessing element (265) to retrieve a listing of application-designated items, as well as ten item shells from each of the listing of frequently used items and the listing of recently used items, where these listings reside in a data store on the operating system (220). In another instance, the configuration settings are provided by the target application (230).

By way of example only, the configuration settings provided by the target application (230) may direct the accessing element (265) to retrieve five item shells from each of the listing of upcoming appointments and the listing of favorite websites (located in a data store controlled by the target application (230)) and a listing of frequently used items. As another example, the configuration settings provided by the target application (230) may direct the accessing element (265) to retrieve one listing of application-designated item shells if the application (230) is in one state (e.g., a user is logged out), and the target application (230) may update the configuration settings when the target application (230) changes to another state (e.g., a user is logged in) so that that updated configuration settings direct the accessing element (265) to retrieve another listing of application-designated item shells. Accordingly, in addition to pointing the accessing element (265) to appropriate data stores for accessing item shells, the configuration settings can assist in determining which, and how many, item shells to retrieve for incorporation into the destination list.

In an exemplary embodiment, determining properties of the submenu area allocated for displaying the destination list includes retrieving attributes of the submenu area, such as size (e.g., width and height) and/or area required by each item shell once converted to a destination. In one embodiment, these attributes may be gathered by requesting coordinates of the submenu area. Based on the properties of the submenu area, the determining component (260) can be capable of calculating the number of item shells that can be entered into the destination list. In particular, these properties assist in determining how many item shells may be selected for entry in each of the category heads of the destination list. In embodiments, the category heads are representations of the determined listings that are identified for accessing. For instance, a category head "Frequent Items" would represent the listing of frequently used items, while the category head "Recent Websites" would represent the listing of recently-visited websites, and the category head "Tasks" would represent application-designated items. Thus, by utilizing the configuration settings and the properties of the submenu area in conjunction, the determining element (260) can identify (a) the appropriate item shells for constructing the destination list and (b) where the identified item shells are located. The configuration settings may include information from a number of sources, such as the target application (230) and/or the operating system (220). For example, an application, such as the target application (230), may indicate the number of application-identified items to be represented in one or more application-designated listings, and the operating system (220) may indicate the number of items to be represented in each of one or more usage-based listings. Some categories may be given priority in determining how many item shells from each category should be used to construct the destination list. For example, the configuration settings can specify that all application-designated item shells will be included if there is enough space for them, and that any remaining space will be split evenly between recent items and frequent items.

The accessing element (265) retrieves the appropriate item shells from the proper listings/data stores as identified by the determining component (260). In embodiments, a calling component (240) is established to communicate with the target application (230) in order to retrieve the item shells (292) that are monitored and maintained thereby, as discussed above with reference to the aggregation component (295). Although the calling component (240) is shown and described as being operably coupled to the target application (230), the accessing element (265) could ask the calling component (240) to communicate with any local or remote data store to retrieve the appropriate item shells. Accordingly, the calling component (240) facilitates accessing listings exposed by a variety of applications. In this way, the list-generation process is extensible to retrieve item shells from a variety of applications, including applications that are developed after installing the operating system (220) on the computing device (210).

Upon retrieving the appropriate item shells, the deriving element (270) creates the destination list from destinations derived from the item shells. As discussed above, the destinations are derived from retrieved item shells such that when surfaced at the UI display (225), the destinations indicate the items that correspond to the item shells and, typically, provide a link to the items. In embodiments, the indication of the items is based on the item identifier or display name expressed by the item shell, and the link to the items is pulled from the location of the item (e.g., address or command line), which is also included within the item shell. As such, upon receiving an indication of a user-initiated selection at a destination surfaced within the submenu area, the item identified by the destination is invoked by following the link to the content or command item. Generally, invoking an item includes launching an application that manages the item (i.e., that manages a content item or performs a command) and automatically executing the command or opening the content item within the application without requiring additional user participation.

In embodiments, the populating element (275) is configured to populate the destination list with derived destinations. Typically, the destinations are hierarchically arranged (e.g., according to an ordering) as independent entries within the destination list. The ordering may be based on the configuration settings, as discussed above, or any other method for ordering known to those of skill in the relevant field. In one instance, destinations derived from ranked item shells within a listing are ordered according to the ranking. By way of example only, destinations derived from the five highest ranked item shells in the listing of frequently used items are arranged with the first-ranked destination as the top entry under a category head of the destination list, and the fifth-ranked destination as the bottom entry. As another example, destinations derived from application-designated item shells can be listed in an order that is indicated by the target application (230). Category heads, which are based on listings as discussed above, or other separators can be inserted into the destination list to divide groupings of destinations from a common listing. For example, category heads could include "Recently Used" for recently used items, "Frequently Used" for frequently used items, and "Tasks" for application-designated items. The category heads could come from various sources, such as the target application (230) and/or the operating system (220). For example, some category heads could be designated by the operating system (220) and some could be designated by the target application (230). Accordingly, users are quickly guided to a section of the submenu area that has destinations relevant to their present task.

In embodiments, the rendering component (280) is configured to provide the generated destination list (299), or a representation thereof, to the UI display (225). In particular, the rendering component (280) may provide for presenting the destinations and category heads, as arranged by the population element (275), within the submenu area. As such, the user is provided with a rich list of destinations that point to items associated with a selected application, allowing a user easily to cause the application to launch and perform a selected item.

Exemplary Techniques

Figure 3:
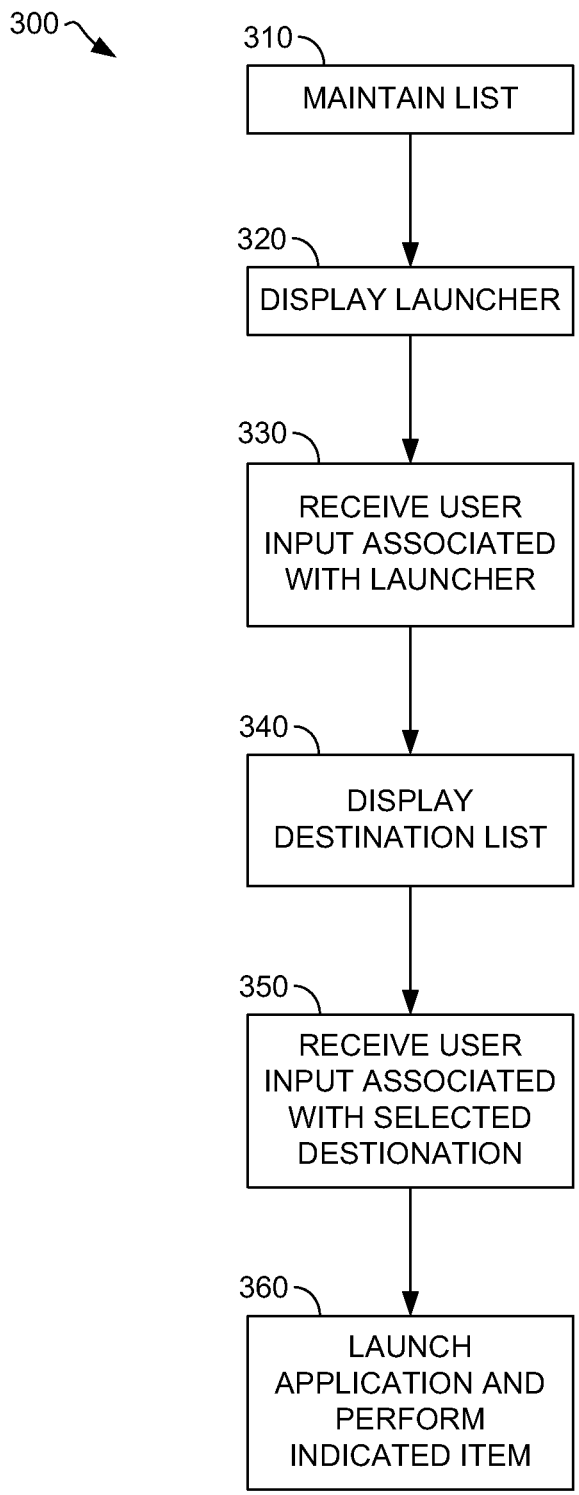
FIG. 3 is a flow diagram illustrating an overall method for launching an application and performing an item indicated on a destination list, in accordance with a described embodiment.

Referring now to FIG. 3, a flow diagram is shown that illustrates an overall technique or method (300) for displaying and using a destination list. A destination list can be maintained, as indicated at a block (310). This maintenance may include receiving and processing usage data and/or data from an application designating items to be included in the destination/list (such as with the receiving/calling component (240), the aggregation component (250), and the list-generation component (255)). This maintenance can include initially building a list, updating a list that has already been built, or both.

As indicated at a block (320), an application launcher can be displayed (such as on the user interface (225)). The application launcher can be displayed in a variety of ways and situations, such as in association with a general menu including a general listing of available applications (e.g., a menu accessed by selecting a displayed start button) or a taskbar.

As indicated at a block (330), a user input associated with the launcher can be received (e.g., by the input-receiving component (235)). For example, the launcher may include a displayed button and/or icon on the user interface (225), and the user input may include a user clicking on an adjacent icon or button (such as a split button), or it may include hovering a cursor over a target area including or adjacent to the icon or button.

A destination list, such as an application-specific destination list, can be displayed (such as on the user interface (225)), as indicated at a block (340). The destination list may be displayed in response to the user input associated with the application launcher, and it may be displayed even if the application is currently inactive, but could also be displayed if the application is running. The destination list may be displayed in association with the application launcher, such as in a menu area near or overlapping with the launcher on a user interface display. The destination list may include usage-based destination listings (e.g., indicating frequently and/or recently used items) and/or application-designated listings (e.g., indicating important task items, as indicated by a target application).

As indicated at a block (350), user input can be received (e.g., by the input-receiving component (235)) in association with the displayed destination list to select an item indicated by one of the destinations on the list. For example, the displayed destination list may include a series of displayed destinations and the user input may include a user clicking on the area occupied by the destination indicating the selected item.

As indicated at a block (360), the application associated with the destination list can be launched, if it is not already running, and the selected item can be performed by the application. This may be done without requiring additional user input. As an example, if a destination with a display name "Send New Mail" is selected in association with an email application display in the launcher, the email application can be launched and a template for a new email message can be displayed. A user can then fill in necessary information (e.g., an email address and a text message) and click on a displayed "Send" button to send an email message. As another example, if a destination having a display name "Create #10 Envelope" is selected in association with a word processing application, then the word processing application can be launched and a template for a #10 envelope can be opened in the application.

Figure 4:
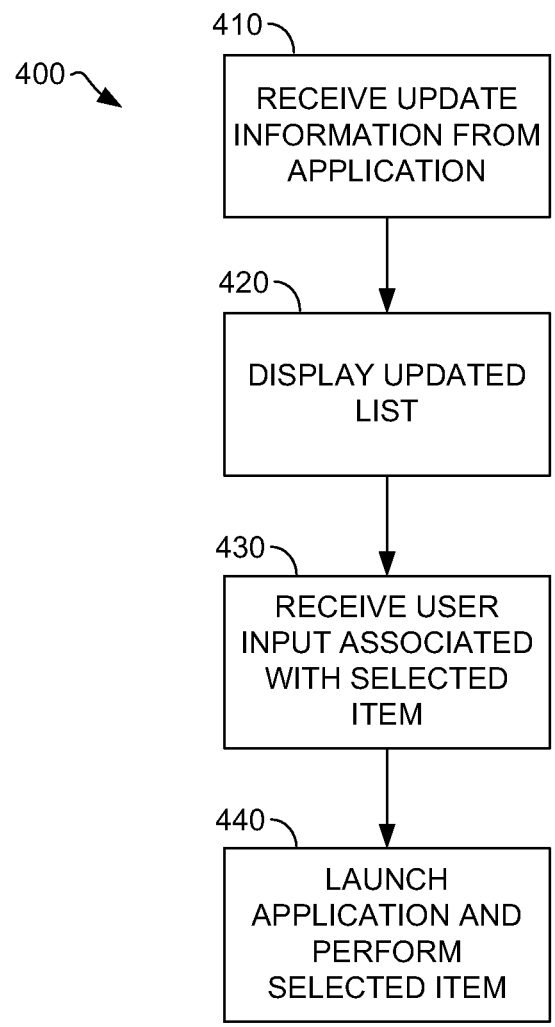
FIG. 4 is a flow diagram illustrating an overall method for launching an application and performing an item indicated on an updated destination list, in accordance with a described embodiment.

Referring now to FIG. 4, a flow diagram is shown that illustrates a general method or technique (400) for displaying and using an updated destination list. As indicated in a block (410), update information can be received from an application (such as with the calling/receiving component (240)). As an example, this update information may be an indication from an application that one or more updated application-designated items should replace existing items in a destination list associated with the application. As an example, if the application-designated items had previously included an item for signing into an instant messaging application, then the updated items might instead include an item for signing out of the instant messaging application.

As indicated in a block (420) an updated destination list can be displayed. For example, this might include displaying a list with an updated "Sign Out" destination indicating a signing out item in place of a prior "Sign In" destination indicating a signing in item.

As indicated in a block (430), user input can be received in association with a selected item indicated by a selected destination. In addition, as indicated in a block (440), the associated application can be launched, if it is not already running, and the indicated item can be performed by the application in response to the user input.

Figure 5:
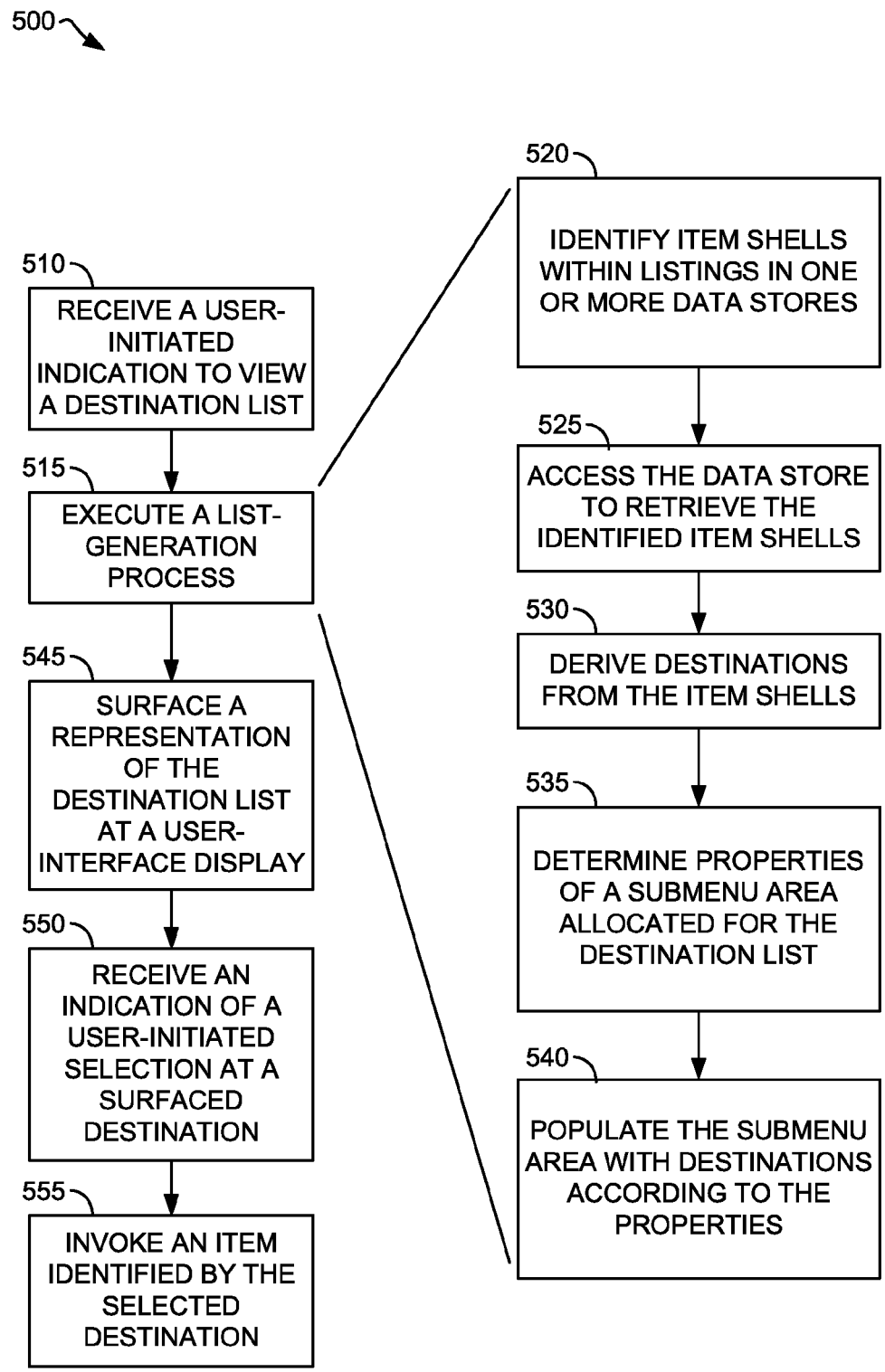
FIG. 5 is a flow diagram illustrating an overall method for presenting a destination list at a user-interface display, in accordance with a described embodiment.

Turning to FIG. 5, a flow diagram is shown that illustrates an overall method or technique (500) for presenting a destination list at a user-interface display. Initially, a user-initiated indication to view a destination list is received (e.g., utilizing the input-receiving component (235)), as indicated at a block (510). The indication can be done in association with an application launcher and may include, at least, one or more of the following actions: traversing a cursor tool into a trigger area proximate to an application launcher; selecting a split button rendered on a UI display near an application launching icon (e.g., UI display (225)); hovering the cursor tool over an application icon pinned to a taskbar; or selecting an application launcher within an application menu. Incident to receiving the indication to view a destination list, a list-generation process is executed (e.g., utilizing the list-generation component (255)), as indicated at a block (515). Generally, the list-generation process constructs a destination list by performing operations such as the following: identifying item shells at a data store, accessing the data store to retrieve the identified item shells, deriving destinations from the item shells, determining properties of a submenu area, and populating the submenu area with the destinations. This may be done whether or not the corresponding application is currently running.

In particular, the item shells can be identified within listings in one or more data stores (e.g., utilizing the determining element (260)), as indicated at a block (520). The listings may be one or more of the listing of recently used items, the listing of frequently used items, the listing of application-indicated items, and another listing maintained by an application. As such, the list-generation process can be extensible to selecting item shells from various local and remote listings. As more fully discussed above, the item shells can be identified according to configuration settings of the destination list. As indicated at a block (525), the identified item shells can be retrieved from their respective listings upon accessing the data stores (e.g., utilizing the accessing element (265)). Destinations can be derived from the identified item shells (e.g., utilizing the deriving element (270)), as indicated at a block (530). Typically, the destinations are derived from retrieved item shells such that when surfaced at a UI display, the destinations indicate the items that correspond to the item shells and, typically, provide a link to the items, such as content items or commands. In embodiments, the indication of the items is based on the item identifier or display name exposed by the item shell, and the link to the items is pulled from the location of the item (e.g., a path and file name or a command line) embedded in the item shell. In other instances, the item shells are generally stored shortcuts (i.e., links) to the appropriate items that comprise the destination list. As indicated at a block (535), properties of a submenu area allocated for the destination list can be determined. In one instance, determining includes measuring the size of the submenu area to determine a window height, a window width, and other dimensional attributes of the submenu area. The submenu area may then be populated by the destinations in accordance with the determined properties (e.g., utilizing the populating element (275)), as indicated at a block (540).

As indicated at a block (545), the destination list can be surfaced within the submenu at the UI display (e.g., utilizing the rendering component (280)). Incident to surfacing the destination list, a destination within the submenu area may be indicated by a user-initiated selection, as indicated at a block (550). Again, this may be done whether or not the application is currently running. The selection may comprise any method of selecting content presented on a UI display known in the relevant field. As indicated at a block (555), upon detecting the indication, an item identified by the selected destination (e.g., by way of the item identifier or display name) is invoked. Generally, invoking the item includes launching an application that manages the item and performing the corresponding item, such as by opening a corresponding item or executing a corresponding command or series of commands within the application.

Figure 6:
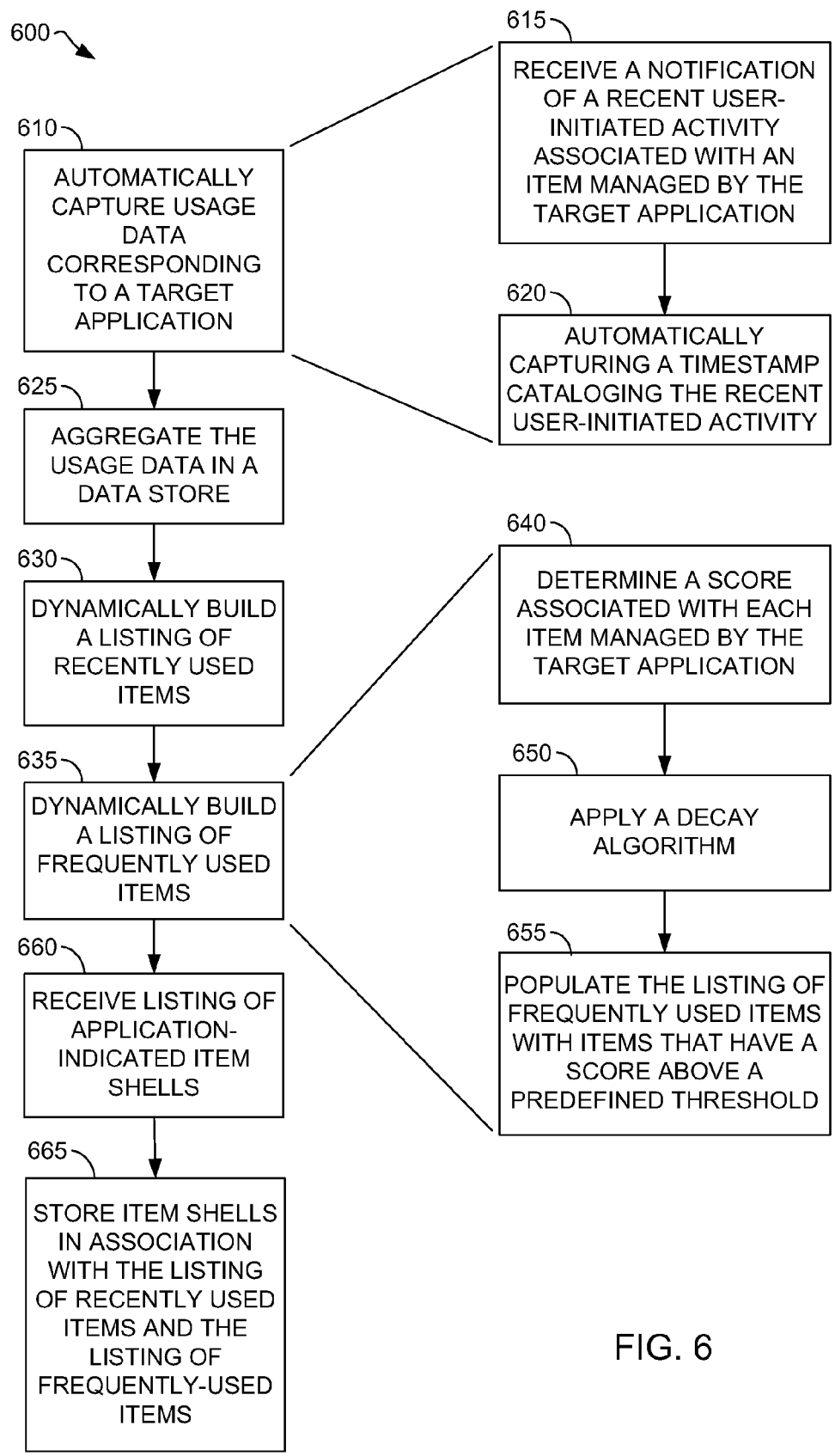
FIG. 6 is a flow diagram illustrating an overall method for generating a destination list utilizing data corresponding to a target application, in accordance with a described embodiment.

With reference to FIG. 6, a flow diagram is shown that illustrates an overall method or technique (600) for generating a destination list utilizing usage data and/or application-designated data corresponding to a target application. Initially, as indicated at a block (610), usage data that corresponds to a target application can be automatically captured. In embodiments, automatically capturing usage data includes receiving a notification of a recent user-initiated activity associated with an item managed by the target application, as indicated at a block (615), and automatically capturing a timestamp cataloging the recent user-initiated activity, as indicated at a block (620). As indicated at a block (625), the usage data can be aggregated in a data store. As indicated at a block (630), a listing of recently used items can be dynamically built based on the usage data. In one instance, the listing of recently used items is ordered by ranking the most recently used item first, according to a comparison of the timestamps, the second most recently used item second, and so on.

As indicated at a block (635), a listing of frequently used items can be dynamically built utilizing the usage data. Initially, the listing of frequently used items can be dynamically built by determining a score associated with each item managed by the target application, as indicated at a block (640). A decay algorithm can be applied to the scores of the items, as indicated at a block (650), thereby increasing the relevance of the listing. As indicated at a block (655), the listing of frequently used items can be populated with items having a score above a predefined threshold. In one embodiment, the predefined threshold corresponds to an attribute of the configuration settings that governs which, if any, items from the listing of frequently used items are represented in the destination list. As indicated at a block (660), a listing of application-designated item shells can be received (such as from a target application (230)). Such application-designated item shells could represent important application-specific items, such as tasks that are commonly performed by many users of a target application. Such items can be represented by destinations on a destination list regardless of the usage of a particular user. As indicated at a block (665), item shells can be stored in association with the above listings. In one instance, destinations are derived from the item shells while, or upon, building the listings. These destinations to items may be indexed based on an ordering of item shells within the listings above.

Exemplary Displays

Figure 7:
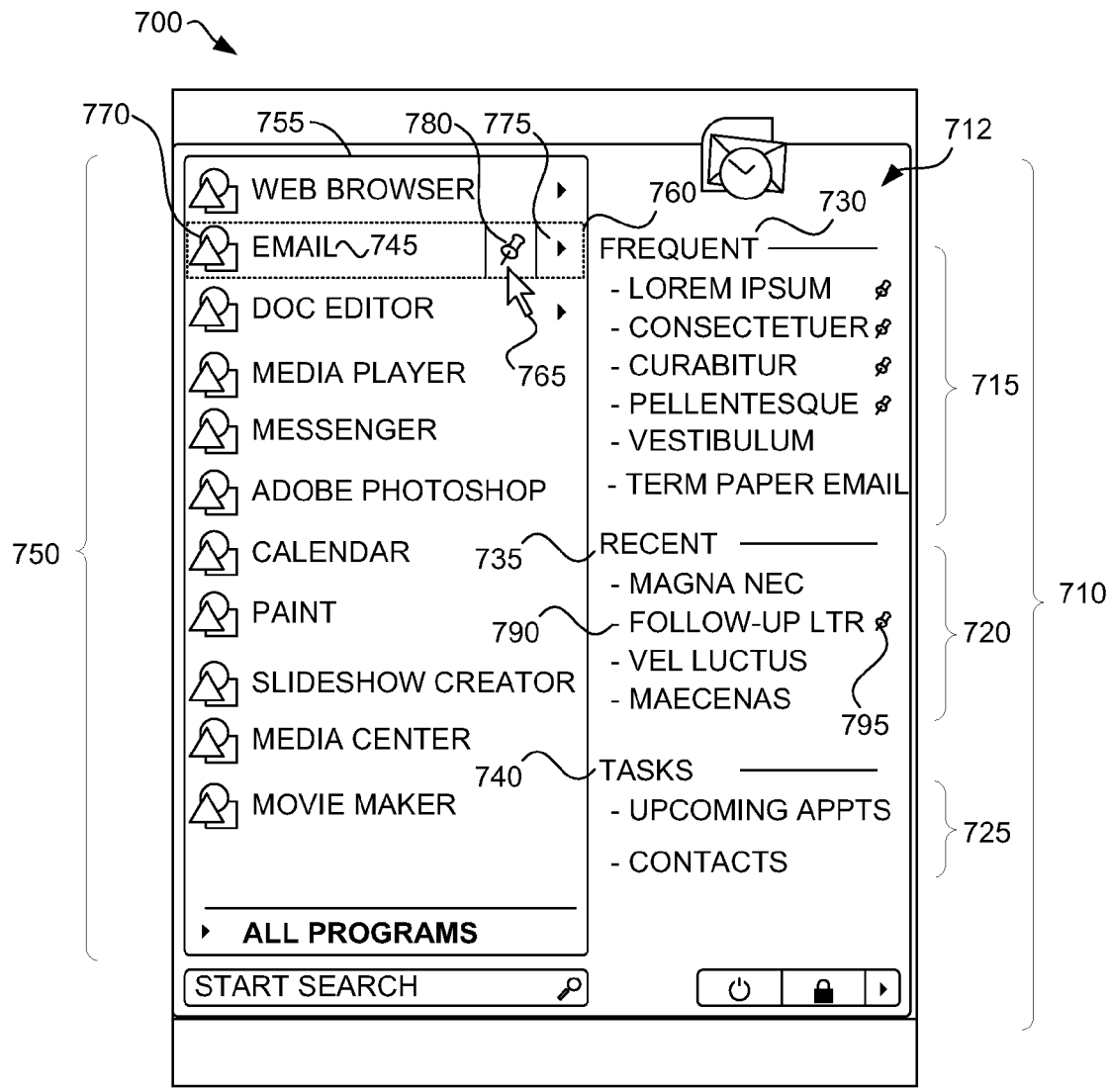

With reference to FIGS. 7-11, screen displays are shown that illustrate exemplary display areas that include an application launcher and an associated destination list submenu area populated with destinations indicating application-specific items, in accordance with described embodiments. Turning to FIG. 7, an exemplary display area (700) is shown that includes a submenu area (710) populated with destinations (715, 720, and 725). As discussed above, the content of the submenu area (710) is the destination list (712) of destinations representing corresponding items. Accordingly, the configuration settings of the destination list (712) can guide the arrangement of the destinations (715, 720, and 725) within the submenu area (710). In the embodiment illustrated, three listings are accessed for populating the destination list (712), which are represented by category heads (730, 735, and 740). In particular, the category head "Frequent" (730) identifies the destinations (715) therebelow as representing frequently used items. The category head "Recent" (735) identifies the destinations (720) therebelow as representing recently used items. In addition, the category head "Tasks" (740) identifies destinations (725) therebelow as items that are application-identified tasks, which can be performed by a corresponding email application. As such, this destination list (712) represented in the submenu area (710) is associated with an email application and with the application launcher (745).

The email application is represented by a button in an application launcher (745) and resides within a listing of application launchers (750). In embodiments, an icon (770) related to the application launcher (745) is presented. The listing (750) is arranged by recently-launched applications, frequently-launched applications, or any other ordering scheme known in the relevant field. In one embodiment, the listing (750) is surfaced within a menu area (755), which can be invoked by selecting a button or trigger (not shown) on the exemplary display area (700). In another embodiment, the listing (750) is incorporated in a general menu (e.g., invoked upon selecting a "Start" button). Proximate to the application launcher (745) is a trigger area (760). In the embodiment shown, the trigger area (760) overlays a visual display of the application launcher (745).

In operation, in one embodiment, upon a cursor tool (765) entering the trigger area (760), the submenu area (710) is surfaced, even if the application has not already been launched. Typically, a selection within the trigger area (760) will launch the application (e.g., target application 230) that is identified by the application launcher (745). In another embodiment, a split button (775) is surfaced upon the cursor tool (765) entering the trigger area (760). Selection of the split button (775) causes the submenu area (710) to surface. Also, a pin button (780) may be surfaced upon the cursor tool (765) entering the trigger area (760). Selection of the pin button (780), with reference to a particular destination (790) causes the particular destination (790) to be "pinned" to the destination list (712). Pinning implies that the particular destination is appended to the destination list (712), thus consistently surfaced with the submenu area (710) (until the particular destination (790) is deselected as being pinned). In embodiments, a pin indicator (795) signifies that the particular destination (790) is pinned to the destination list (712). A user may be allowed to un-pin a destination that has already been pinned. Also, a user may be allowed to remove a destination from the destination list, whether or not that destination has already been pinned. In some implementations, removing a destination also clears usage-based data for the associated item. Such removed destinations may reappear later, such as if the associated items later meet the requirements for usage-based listings. Pinning, un-pinning, and/or removing may be available for some categories on a destination list but not others. For example, a destination list may include a Tasks category listing that includes destinations indicating application-designated items that a user can neither pin to the destination list, un-pin from the destination list, nor remove from the destination list.

As more fully discussed above, selection of the particular destination (790), or any of the application-specific destinations (715, 720, and 725) of the destination list (712), invokes the item linked to the particular destination (790) by launching the application, if it is not already running, and performing the item.

Figure 8:
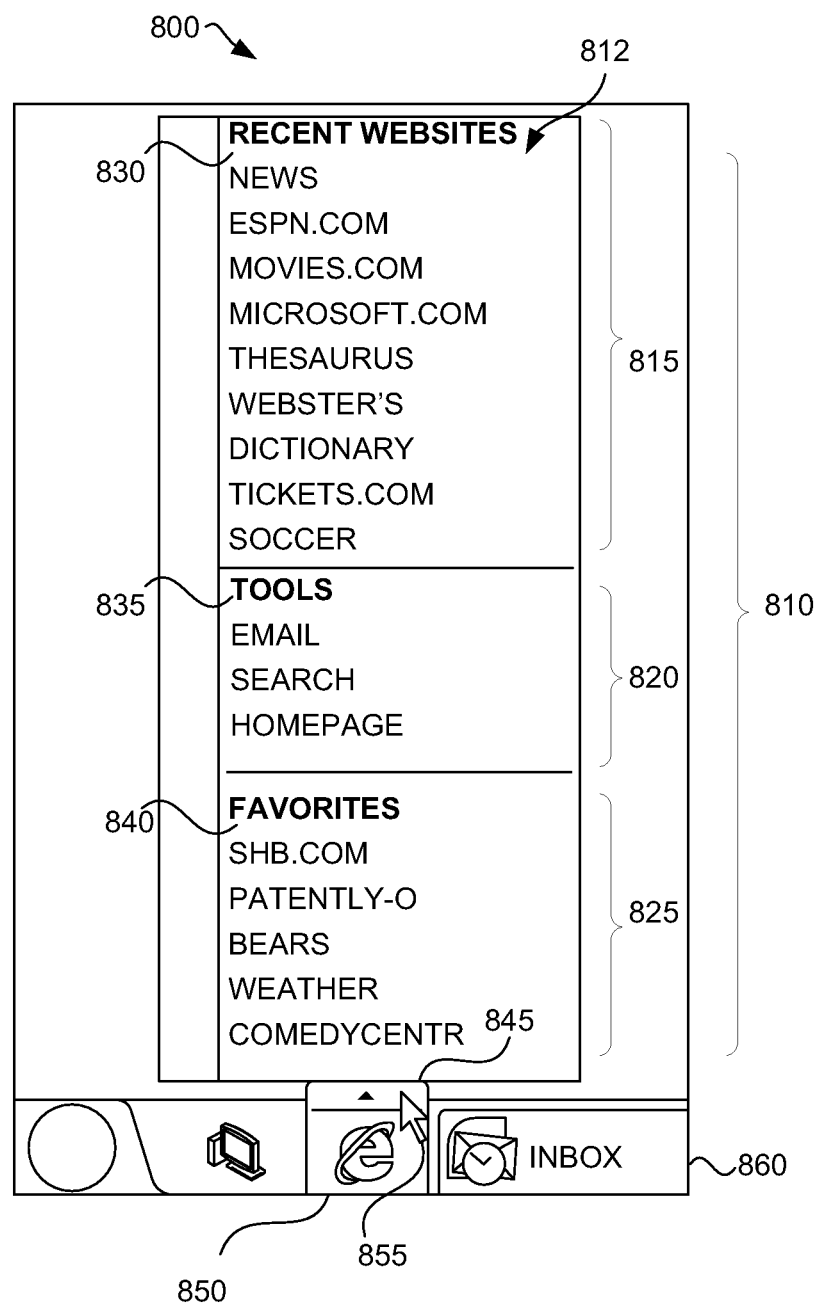

Turning to FIG. 8, an exemplary display area (800) is shown that includes a submenu area (810) populated with destinations (815, 820, and 825). As discussed above, the content of the submenu area (810) is the destination list (812). Accordingly, the configuration settings of the destination list (812) can guide the arrangement of the destinations (815, 820, and 825) within the submenu area (810).

In the embodiment illustrated, three listings are accessed for populating the destination list (812), which are represented by category heads (830, 835, and 840). In particular, the category head "Recent Websites" (830) indicates that the destinations (815) therebelow identify items that are websites, which have been recently visited. Typically, these items are identified by item shells within a listing of recently-visited websites managed by a web-browser application. The category head "Tools" (835) can indicate the destinations (820) therebelow identify tools, which are items that are available to be performed within the web-browser application. In embodiments, the destinations (815, 820, and 825) can reference items that have been recently executed, frequently executed, or identified as a preferred tool by a user. In addition, the category head "Favorites" (840) can indicate the destinations (825) therebelow are destinations that link to a user's favorite websites.

In an exemplary embodiment, selection of one of the destinations (815, 820, or 825) invokes the selected destination. In particular, invoking the selected destination includes launching the web-browser application if it is not running or opening an instance of it if it is already running, and instructing the web-browser application to automatically open a web page at a website referenced by the selected destination. As such, this destination list (812) represented in the submenu area (810) is extensible to listings managed by a web-browser application as well as to listings maintained according to user preferences.

In operation, the submenu (810) is surfaced upon selection of a split button (845) proximate to an application launcher (850) that, upon selection, launches the web-browser application. The application launcher (850) is included within a taskbar (860). Inclusion within the taskbar (860) may be accomplished automatically by an operating system, or manually by a user by pinning the application launcher (850) thereto. In one embodiment, the split button (845) is surfaced upon a cursor tool (855) entering within a trigger area (not shown) proximate to, or substantially overlaying, the application launcher (850). In another embodiment, the split button (845) is consistently surfaced adjoining the application launcher (850). Upon selection of the split button (845), the submenu area (810) can be surfaced, thereby presenting the destination list (812).

Figure 9:
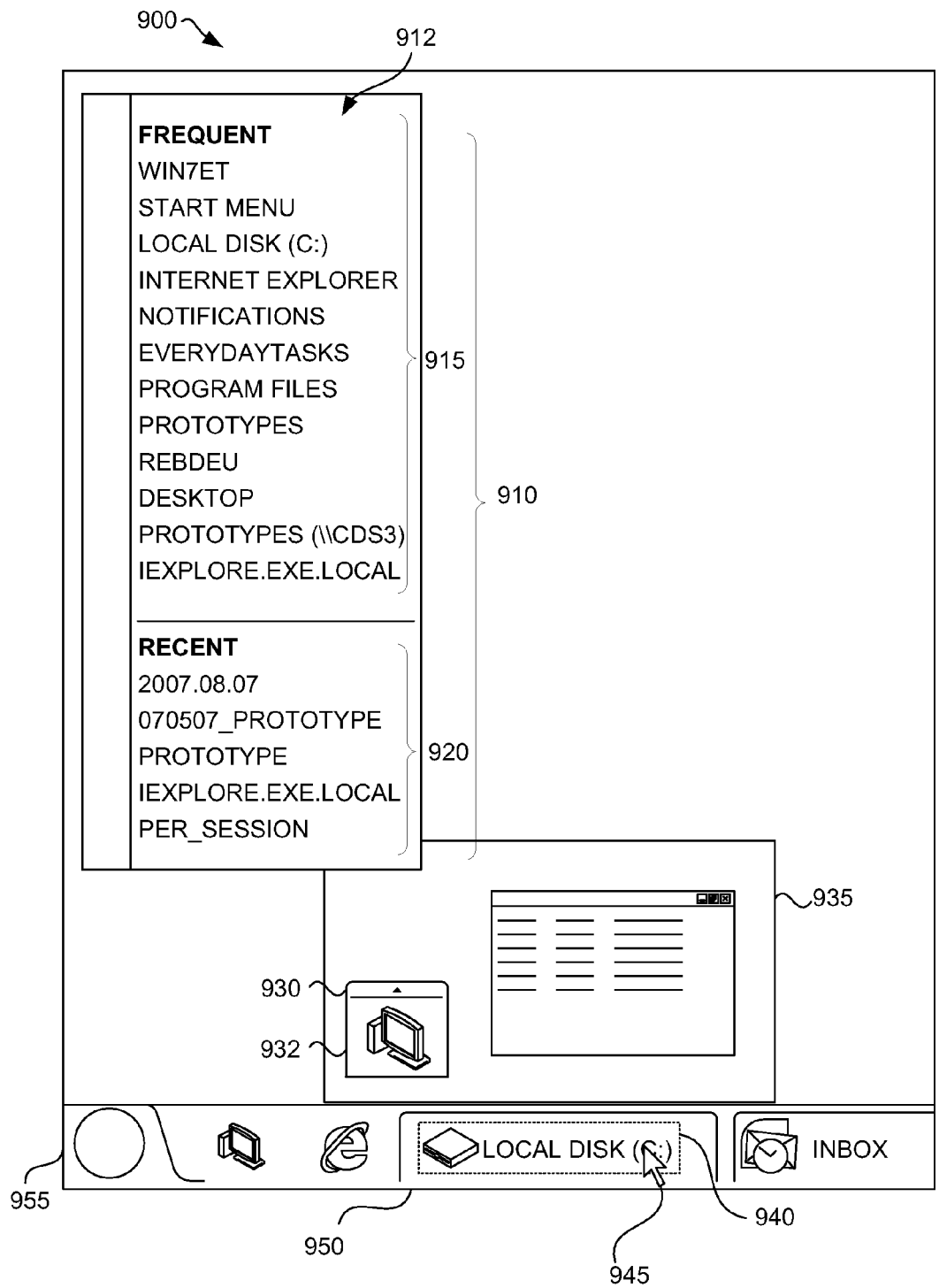

Turning to FIG. 9, an exemplary display area (900) is shown that includes a submenu area (910) populated with destinations (915 and 920). In the embodiment illustrated, two listings are accessed for populating the destination list (912), the listing of frequently used items, referenced by the destinations (915), and the listing of recently used items, referenced by the destinations (920). In operation, the submenu (910) is surfaced upon selection of a split button (930) located adjacent to an application launcher (932) on a preview menu (935). The preview menu (935) is surfaced upon a cursor tool (945) entering within a trigger area (940) that substantially overlies a window switcher (950) pinned to a taskbar (955). In the embodiment illustrated, the application launcher (932), upon selection, launches a directory-navigation application to find particular documents. The preview menu (935) presents a thumbnail view of a page in a directory with documents listed therein. Additionally, the preview menu (935) includes the split button (930). Selection of the split button (930) surfaces the submenu area (910); accordingly, the destinations (915 and 920) are surfaced as suggested by the destination list (912). Alternatively, a user may be able to trigger the surfacing of the submenu area (910) in some other manner, such as from a right mouse click while a cursor tool hovers over a trigger area on a taskbar. In such a situation, it may be desirable to omit the split button (930) from the preview menu (935), and not allow a user to surface the submenu area (910) from the preview menu (935).

Turning to FIG. 10, an exemplary display area (1000) is shown that includes a submenu area (1010) populated with destinations (1015, 1020, 1025, and 1030). As discussed above, the content of the submenu area (1010) is the destination list (1012). Accordingly, the configuration settings of the destination list (1012) can guide the arrangement of the destinations (1015, 1020, 1025, and 1030) within the submenu area (1010).

In the embodiment illustrated, four listings (1015, 1020, 1025, and 1030) are accessed for populating the destination list (1012). Three listings (1015, 1020, and 1025), which are represented by category heads (1040, 1045, and 1050), include destinations representing application-specific items, and one listing (1030) includes destinations representing operating system items (i.e., items to be performed by the operating system, rather than the associated application). In particular, the category head "Pinned" (1040) indicates that the destinations (1015) therebelow identify items that are media files that have been pinned to the destination list (1012) by a user, as described above. Typically, these items are identified by item shells within a listing of pinned items managed by a media application. The category head "Frequent" (1045) can indicate the destinations (1020) therebelow identify frequently accessed media files that are managed by the media application. The category head "Tasks" (1050) can indicate the destinations (1025) therebelow identify items that can be performed by a media application, and that have been designated by the media application to appear on a listing of application-designated items. Below the Tasks destinations (1025) a listing (1030) can include operating system tasks that can be performed by the operating system, rather than the associated application.

In embodiments, the destinations (1015, 1020, and 1025) can reference application-specific items that have been pinned, frequently executed, or identified for inclusion by the associated application. In some embodiments, some destinations may be able to be pinned to the submenu area (1010) by a user, while others may not. For example, destinations in the Frequent listing (1020) may be able to be pinned, while destinations in the Tasks listing (1025) may not be able to be pinned.

In an exemplary embodiment, selection of one of the destinations (1015, 1020, 1025, or 1030)) invokes the selected destination. In particular, invoking an application-specific item destination (1015, 1020, or 1025) can include launching the media application and instructing the media application to automatically perform the selected item, such as by playing a media file referenced by the selected destination, opening a library browsing environment referenced by the selected destination, open an internet radio environment referenced by the selected destination, etc. Invoking an operating system item destination (1030) can include the operating system performing a selected item, such as pinning the associated application to the taskbar or launching the application in a default manner. As such, this destination list (1012) represented in the submenu area (1010) is extensible to listings managed by an operating system, by a media application, and/or according to user data or user preferences.

In operation, the submenu (1010) is surfaced upon selection of a split button (1055) proximate to an application launcher (1060) that, upon selection, launches the media application. The application launcher (1060) can be included within a taskbar (1070). Inclusion within the taskbar (1070) may be accomplished automatically by an operating system, or manually by a user by pinning the application launcher (1060) thereto. In one embodiment, the split button (1055) is surfaced upon a cursor tool (1080) entering within a trigger area (not shown) proximate to, or substantially overlaying, the application launcher (1060). In another embodiment, the split button (1055) is consistently surfaced adjoining the application launcher (1060). Upon selection of the split button (1055), the submenu area (1010) can be surfaced, thereby presenting or displaying the destination list (1012). A user can provide user input that indicates a desire to surface the submenu area (1010) in many different ways. For example, the submenu area (1010) may be surfaced upon a user executing a right mouse click or providing some other user input indication while the cursor (1080) is hovering over a target area, such as the area of the application launcher (1060) or a running window button on a taskbar. This could be done in lieu of, or in addition to, the use of a split button in user interfaces such as those illustrated in FIGS. 7-11.

Turning to FIG. 11, an exemplary display area (1100) is shown that includes a submenu area (1110) populated with destinations (1120, 1122, and 1125). As discussed above, the content of the submenu area (1110) is the destination list (1112). Accordingly, the configuration settings of the destination list (1112) can guide the arrangement of the destinations (1120, 1122 and 1125) within the submenu area (1110).

In the embodiment illustrated, three listings (1120, 1122, and 1125) are accessed for populating the destination list (1112). Two of the listings listing (1120 and 1122), which are represented by a category head (1130), can include destinations representing application-identified, application-specific items. These two listings (1120 and 1122) can be separated by a separator (1135), which is illustrated as a line, but could be some other type of separator, such as a shaded area, a category head, and/or additional space between separate listings. This separator can be similar to other separators between separate listings (715, 720, 725, 815, 820, 825, 915, 920, 1015, 1020, 1025, and 1030) in the destination lists illustrated in FIGS. 7-10, and between the bottom two listings (1122 and 1125) in the destination list (1112) in FIG. 11. An application may designate where this separator will be, as well as which application-designated destinations will be in each of the two separate listings. This could be designated, for example, in the configuration settings for the destination list.

Another listing (1125) can include destinations indicating operating system items. In particular, the category head "Tasks" (1130) can indicate the destinations (1120 and 1122) therebelow identify items that can be performed by an information management application, and that have been indicated by the information management application to appear on a listing of application-designated items. Below the Tasks destinations listings (1120 and 1122), a listing (1125) can include an operating system destination listing with destinations indicating items that can be performed by the operating system, rather than the associated application. The destinations can be invoked and managed in manners similar to other destinations illustrated and discussed above with reference to FIGS. 7-10. The operation of the submenu (1110) and the associated split button (1155), application launcher (1160), taskbar (1170), and cursor (1180) can be similar to corresponding operations described above with reference to FIGS. 7-10.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated by and is within the scope of the claims.

What is claimed is:

1. A computer-implemented method comprising:
receiving from a computer application a designation of one or more application-designated items that can be performed by the application;
displaying a computer application launcher for launching the computer application;
receiving a user input associated with the application launcher;
determining properties of a submenu area allocated for an application-specific destination list for the computer application;
populating the submenu area with one or more destinations according to the properties;
in response to the user input associated with the application launcher, displaying the application-specific destination list for the computer application in the submenu area while the computer application is not running, the destination list comprising the one or more destinations indicating the one or more application-designated items; and
in response to an indication of a user-initiated selection at a selected destination on the destination list, launching the application and instructing the application to perform a selected item indicated by the selected destination without requiring additional user participation beyond the user-initiated selection at the selected destination.

2. The method of claim 1, wherein the selected item is one of the one or more application-designated items.

3. The method of claim 1, wherein the destination list further comprises a listing of operating system destinations indicating items that can be performed by an operating system without launching the computer application.

4. The method of claim 1, wherein the destination list is separated into multiple separated listings comprising:
a listing of destinations indicating application-designated items; and
a usage-based listing of destinations.

5. The method of claim 1, wherein the method further comprises receiving update information from the computer application, wherein the update information comprises information designating an updated item to be indicated by an updated destination on the destination list, and wherein the destination list comprises the updated destination.

6. The method of claim 1, wherein the application launcher is associated with a general menu including a listing of multiple application launchers.

7. The method of claim 1, wherein the application launcher is associated with a taskbar.

8. A computer system comprising:
at least one processor; and
memory comprising instructions stored thereon that when executed by at least one processor cause at least one processor to perform acts comprising:
receiving from an application a designation of one or more application-designated items;
displaying a computer application launcher indicating a computer application;
determining properties of a submenu area allocated for a destination list;
populating the submenu area with one or more destinations according to the properties;
in response to receiving a first user input associated with the launcher while the computer application is not running, displaying the destination list in the submenu area, with the destination list comprising one or more destinations indicating one or more items that can be performed by the application, and with the one or more items that can be performed by the application comprising the one or more application-designated items; and in response to a second user input associated with the destination list and indicating selection of a destination on the destination list, launching the application and instructing the application to perform one of the one or more application-designated items indicated by the selected destination without requiring additional user participation beyond the second user input, the second user input being a user-initiated selection at the selected destination.

9. The computer system of claim 8, wherein the destination list comprises one or more destinations indicating one or more items that can be performed by an operating system without launching the application.

10. The computer system of claim 8, wherein the destination list comprises a usage-based listing comprising one or more destinations indicating one or more items that can be performed by the application.

11. The computer system of claim 10, wherein the usage-based listing comprises a listing of frequently used items.

12. The computer system of claim 10, wherein the usage-based listing comprises a listing of recently used items.

13. The computer system of claim 8, further comprising:
receiving list update information from the computer application;
in response to a third user input associated with the launcher, displaying an updated destination list of one or more destinations indicating items that can be performed by the application, the updated list representing the list update information; and
in response to a fourth user input associated with the updated list and indicating selection of a selected updated destination on the updated list, instructing the application to launch and perform an item indicated by the selected updated destination.

14. The computer system of claim 13, wherein the list update information reflects a change of state of the computer application.

15. One or more computer-readable storage media not consisting of a propagated signal, the one or more computer-readable storage media having computer-executable instructions embodied thereon that, when executed, perform a method comprising:
maintaining an application-specific destination list comprising destinations indicating items that can be performed by a computer application, maintaining the destination list comprising:

receiving a designation from the application of one or more application-designated items to be indicated by one or more application-designated destinations on the destination list; and
including one or more of the application-designated destinations in the destination list;
displaying a launcher that indicates the computer application;
determining properties of a submenu area allocated for the destination list;
populating the submenu area with the one or more application-designated destinations according to the properties; and
in response to a user input associated with the launcher, displaying the application-specific destination list in the submenu area while the computer application is not running.

16. The one or more computer readable media of claim 15, wherein the method further comprises, in response to a user-initiated selection at a selected destination in the destination list, launching the computer application and instructing the computer application to perform an item indicated by the selected destination.

17. The one or more computer readable media of claim 15, wherein the method further comprises receiving updated destination list information when a state of the computer application changes.

18. The one or more computer readable media of claim 15, wherein the destination list comprises a listing of destinations indicating items that can be performed without the application running, a listing of destinations indicating application-designated items, and a usage-based list of destinations indicating items that can be performed by the application, the items indicated by the usage-based list of destinations comprising one or more items that are not application-designated items.

19. The one or more computer readable media of claim 15, wherein maintaining the destination list further comprises influencing contents of the destination list in response to user input, the user input being selected from a group consisting of pinning one or more destinations, unpinning one or more destinations, removing one or more destinations, and combinations thereof.

20. The one or more computer readable media of claim 15, wherein the method further comprises including in the destination list one or more destinations indicating one or more items that can be performed by the application but are not designated by the application.

* * * * *